Aug. 16, 1960 G. H. KRAFT ET AL 2,949,372
PACKAGING
Original Filed June 19, 1951 22 Sheets-Sheet 2
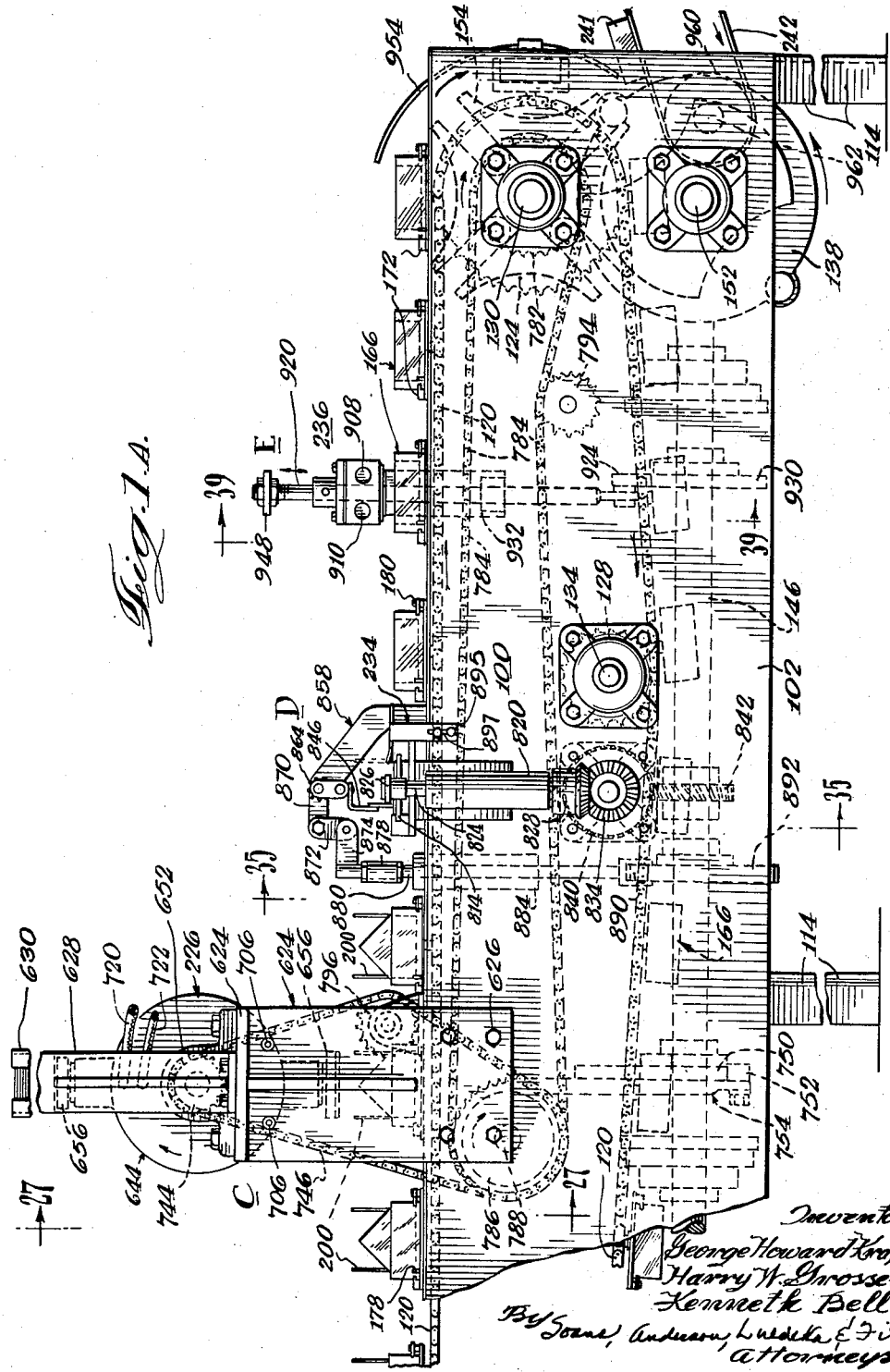

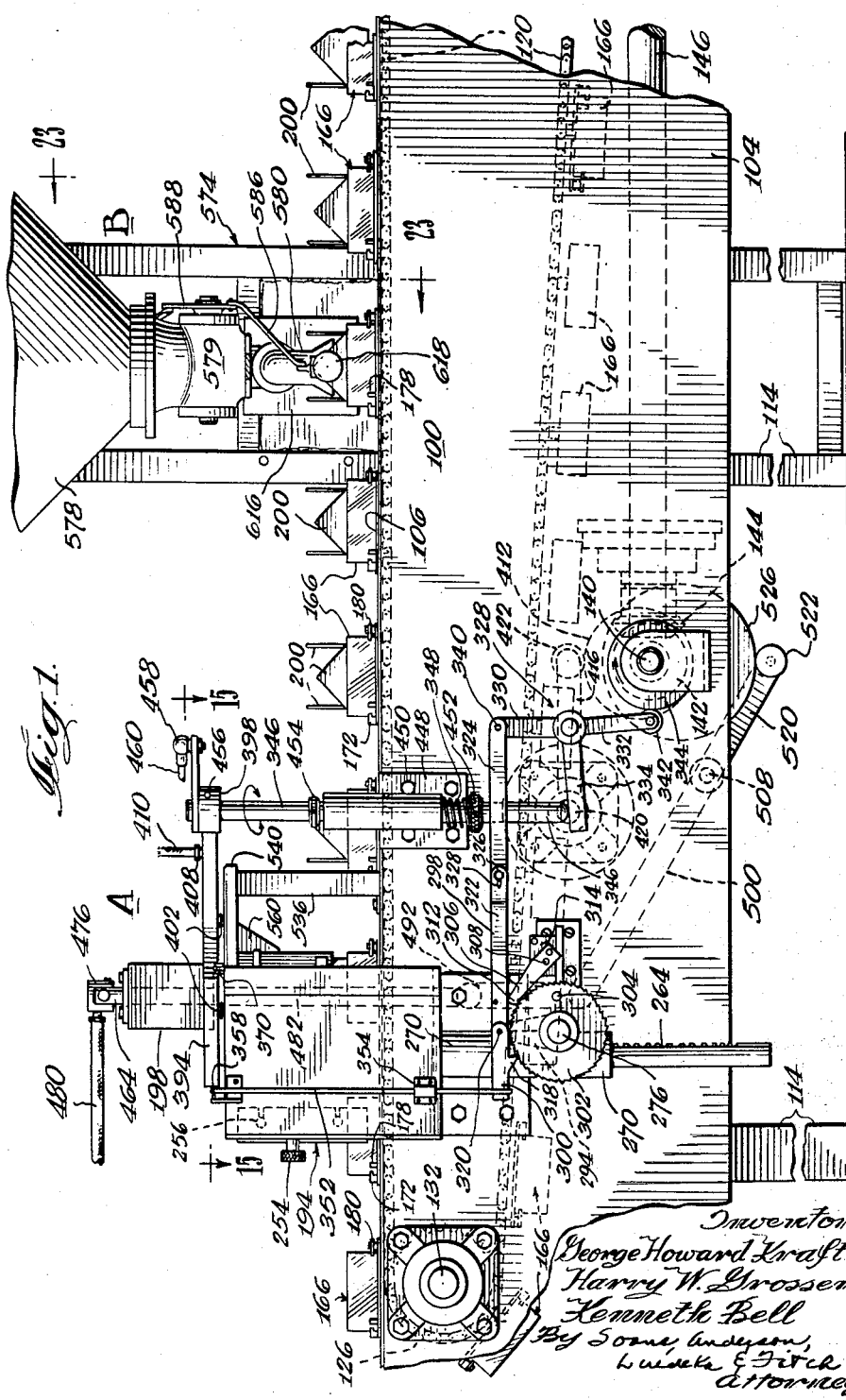

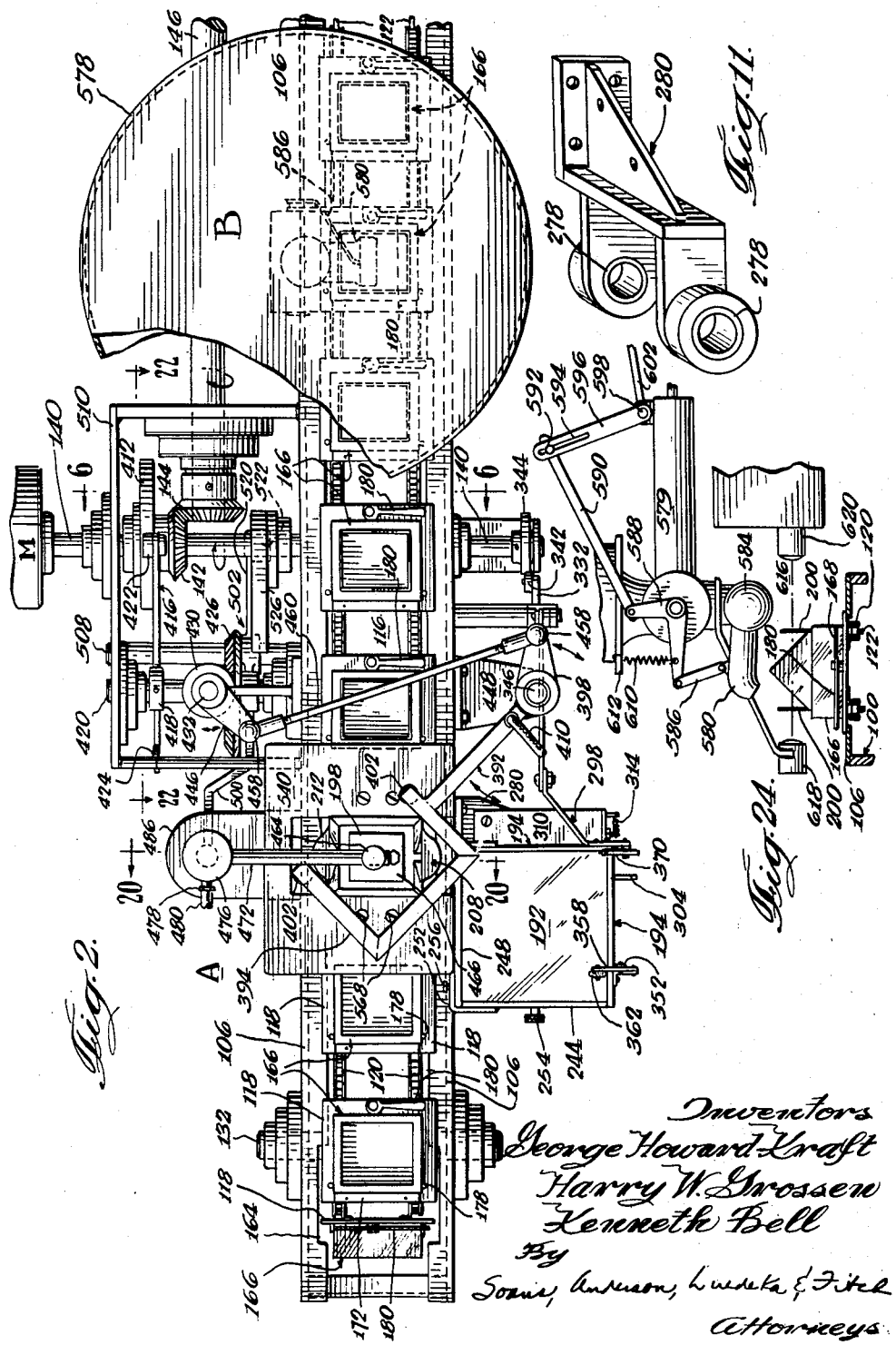

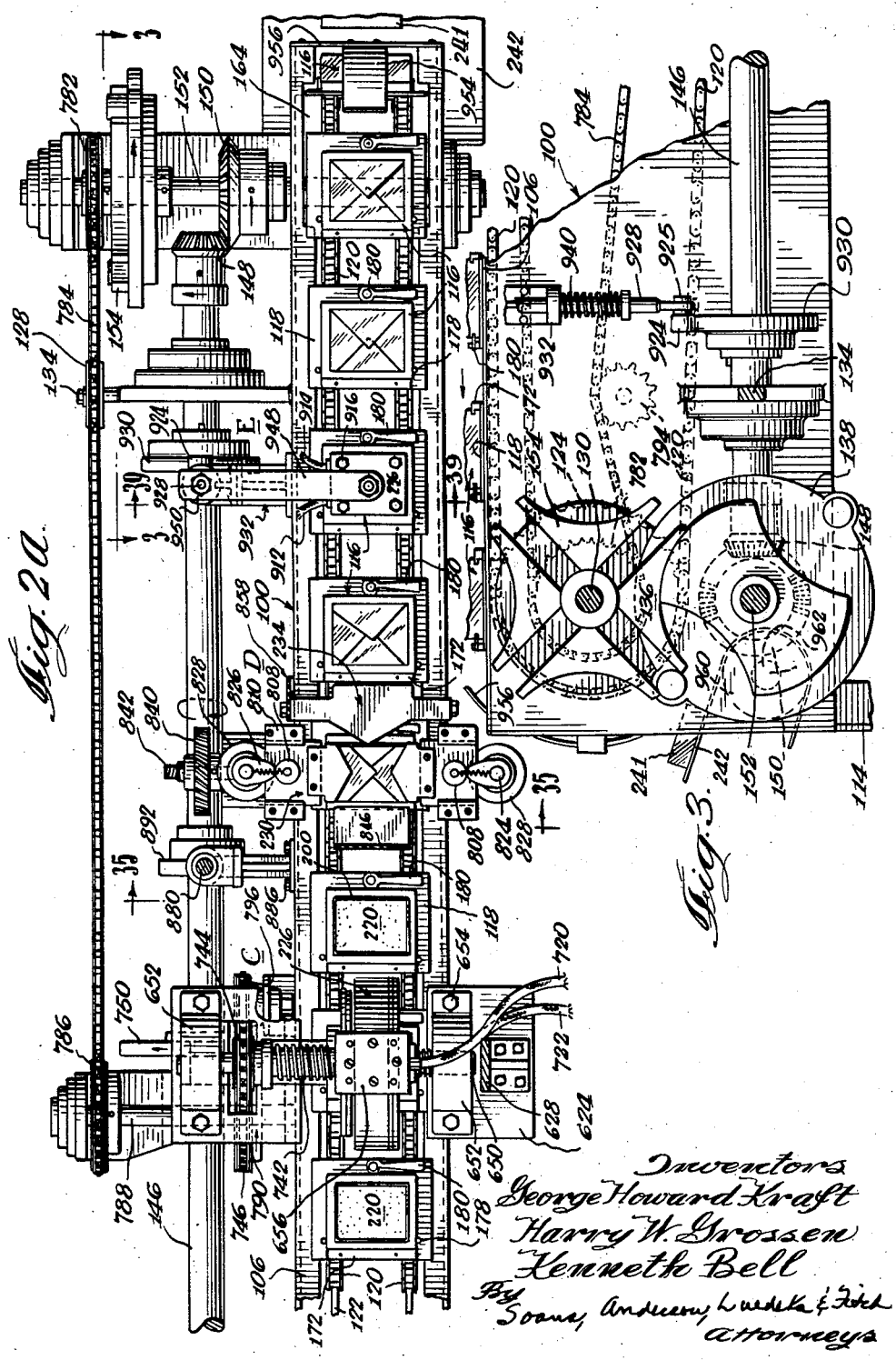

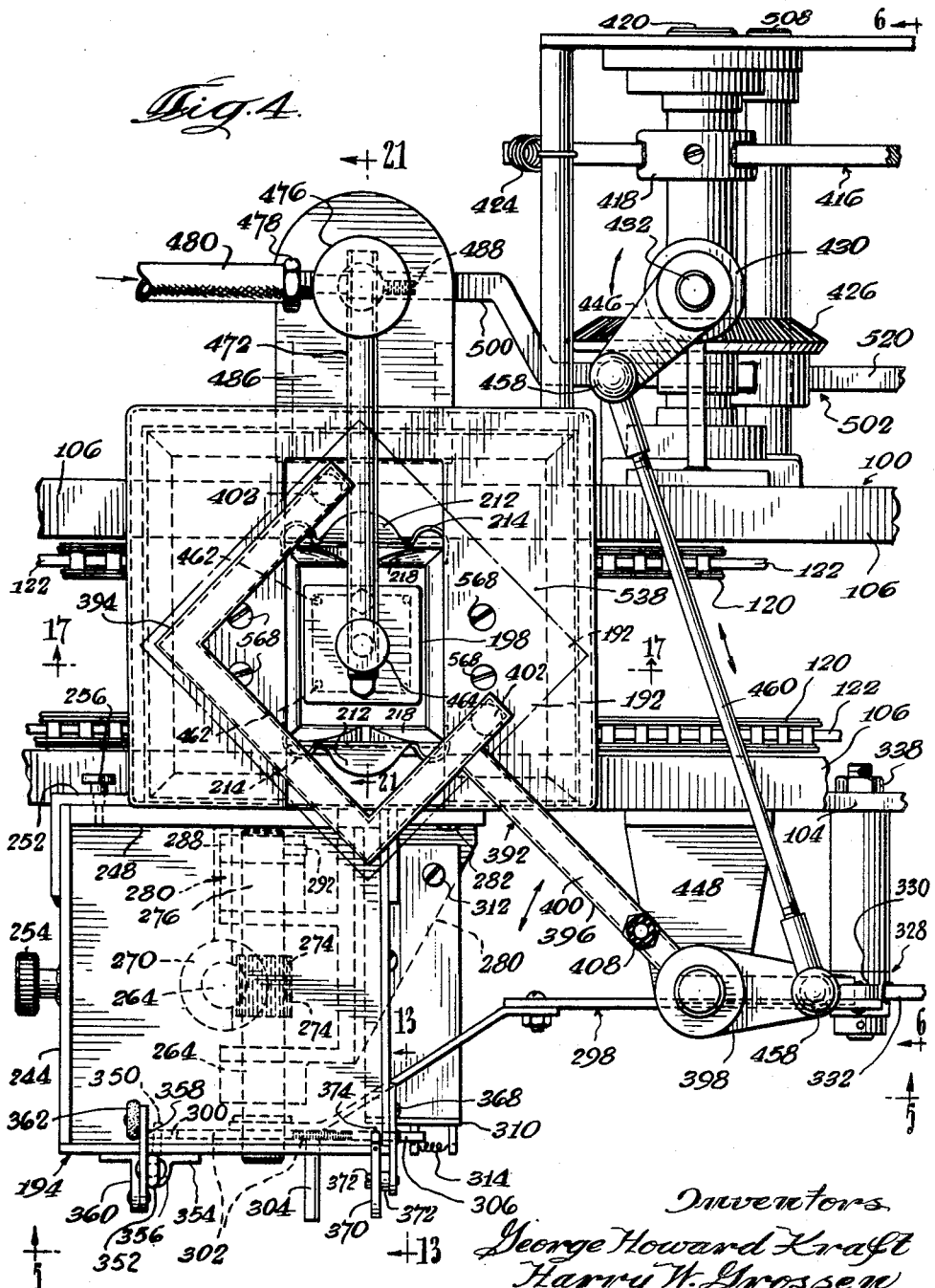

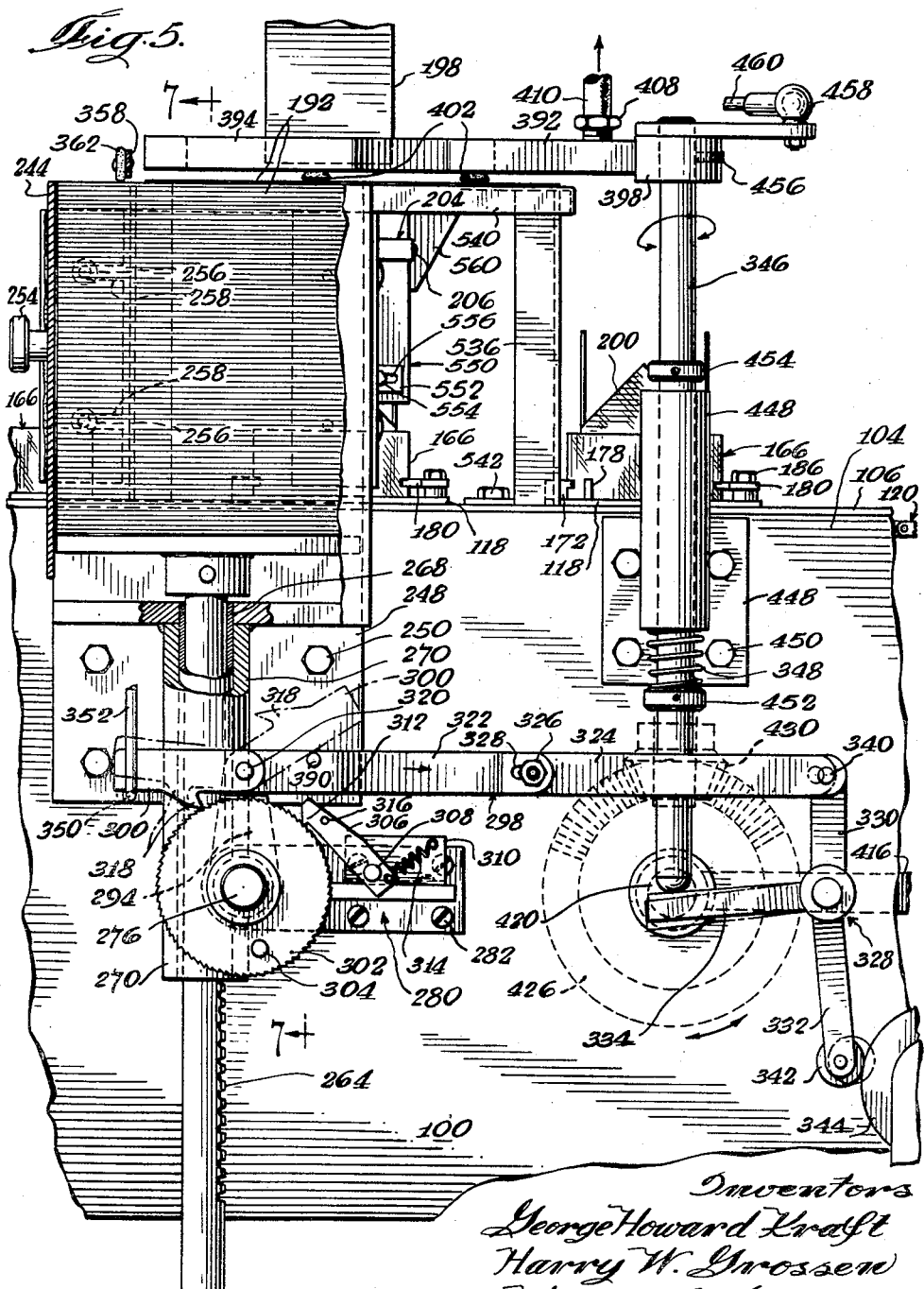

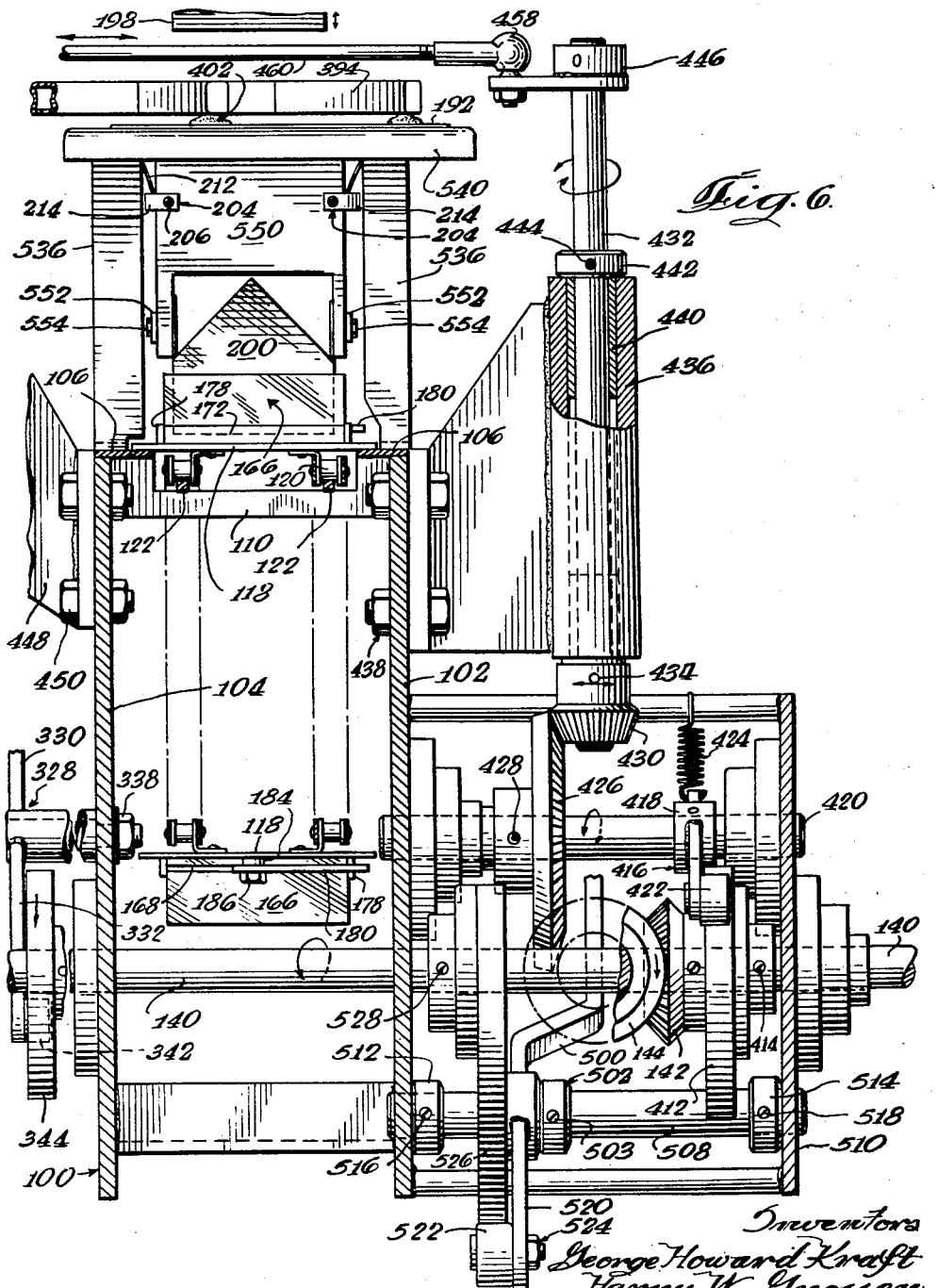

Aug. 16, 1960     G. H. KRAFT ET AL     2,949,372
PACKAGING
Original Filed June 19, 1951     22 Sheets-Sheet 8
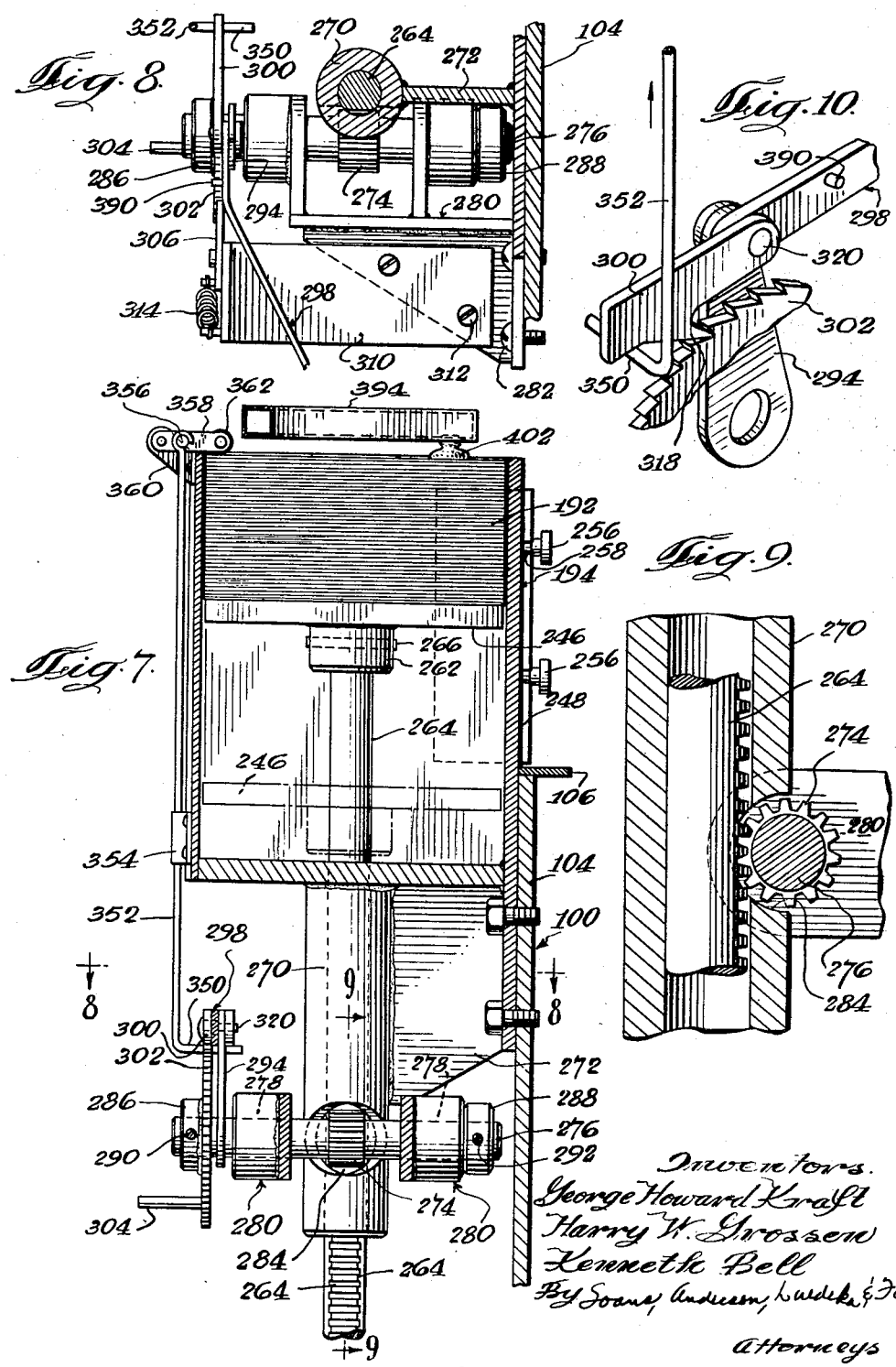

Aug. 16, 1960    G. H. KRAFT ET AL    2,949,372
PACKAGING
Original Filed June 19, 1951    22 Sheets-Sheet 9

Inventors
George Howard Kraft
Harry W. Grossen
Kenneth Bell
By Soans, Anderson, Luedeka & Fitch
Attorneys Aug. 16, 1960    G. H. KRAFT ET AL    2,949,372
PACKAGING
Original Filed June 19, 1951    22 Sheets-Sheet 10
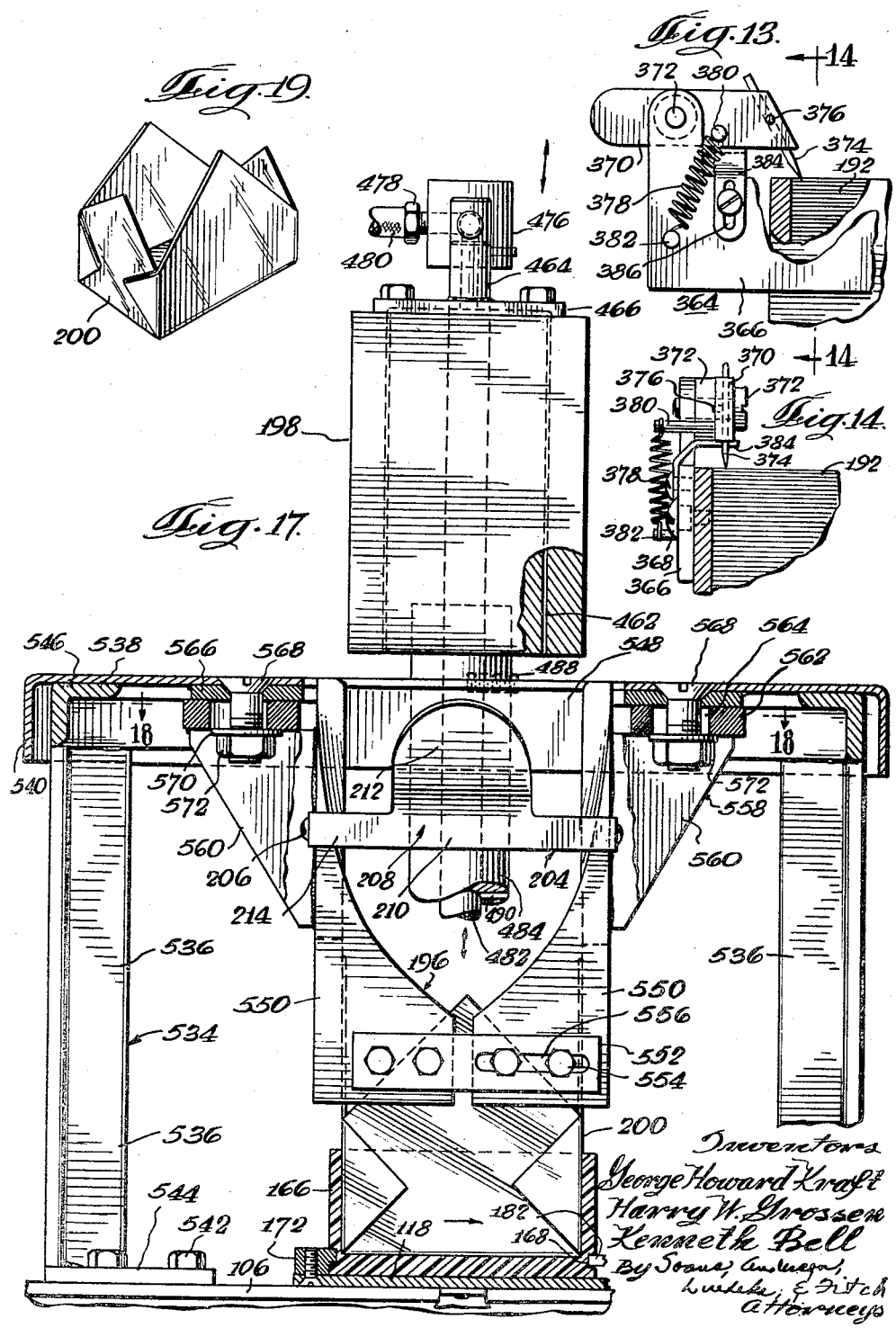

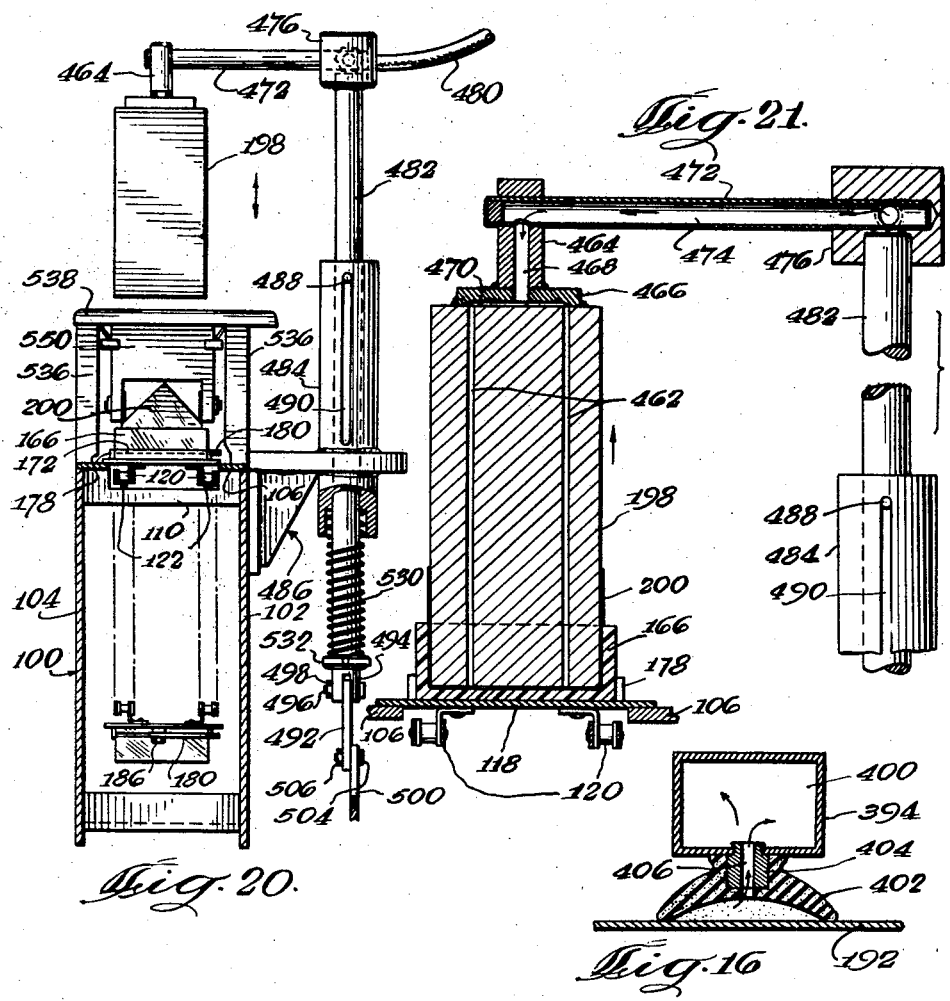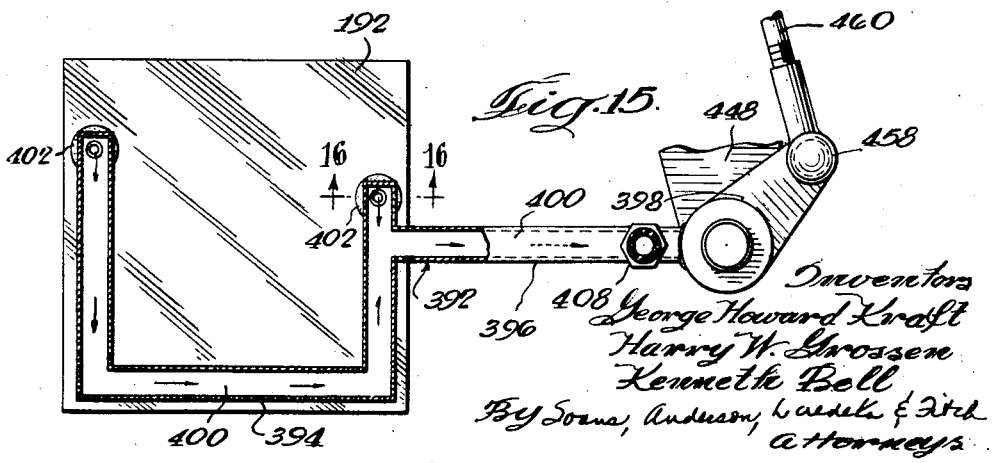

Aug. 16, 1960 G. H. KRAFT ET AL 2,949,372
PACKAGING
Original Filed June 19, 1951 22 Sheets-Sheet 12
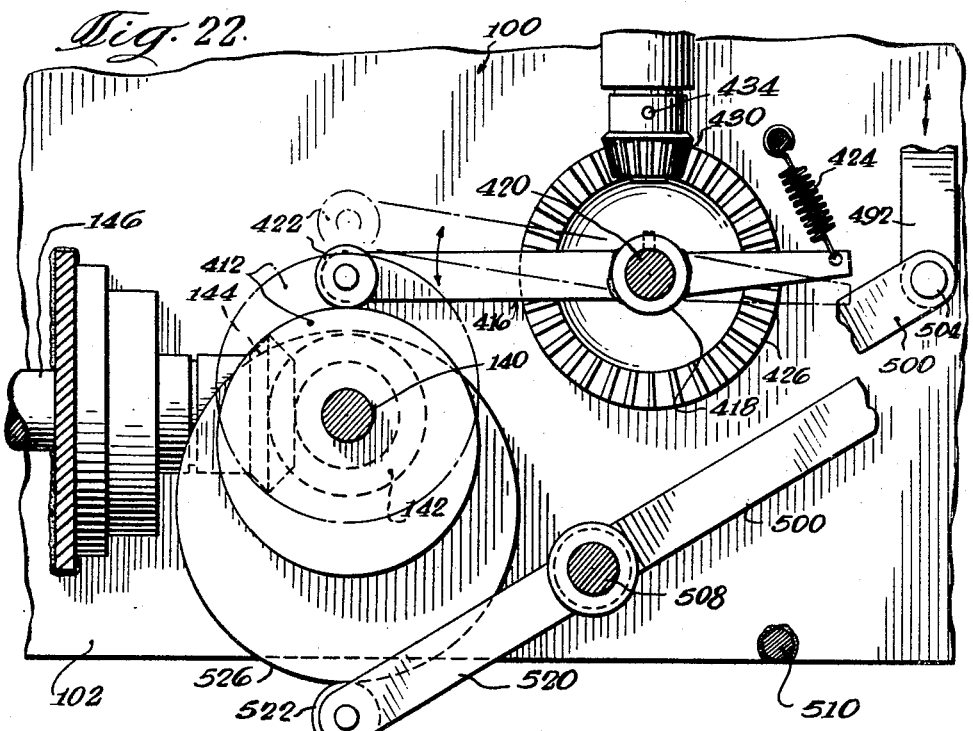
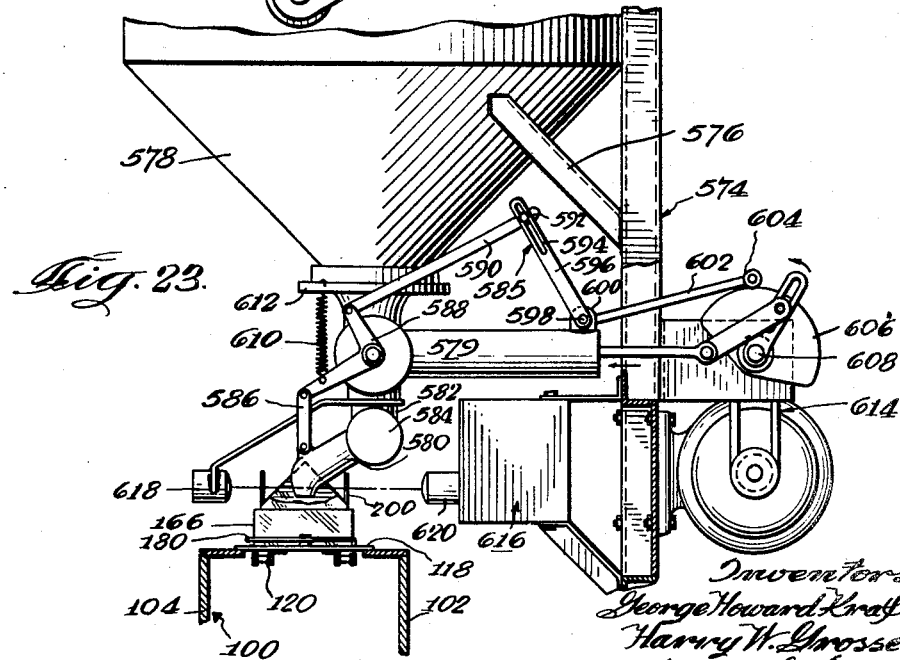

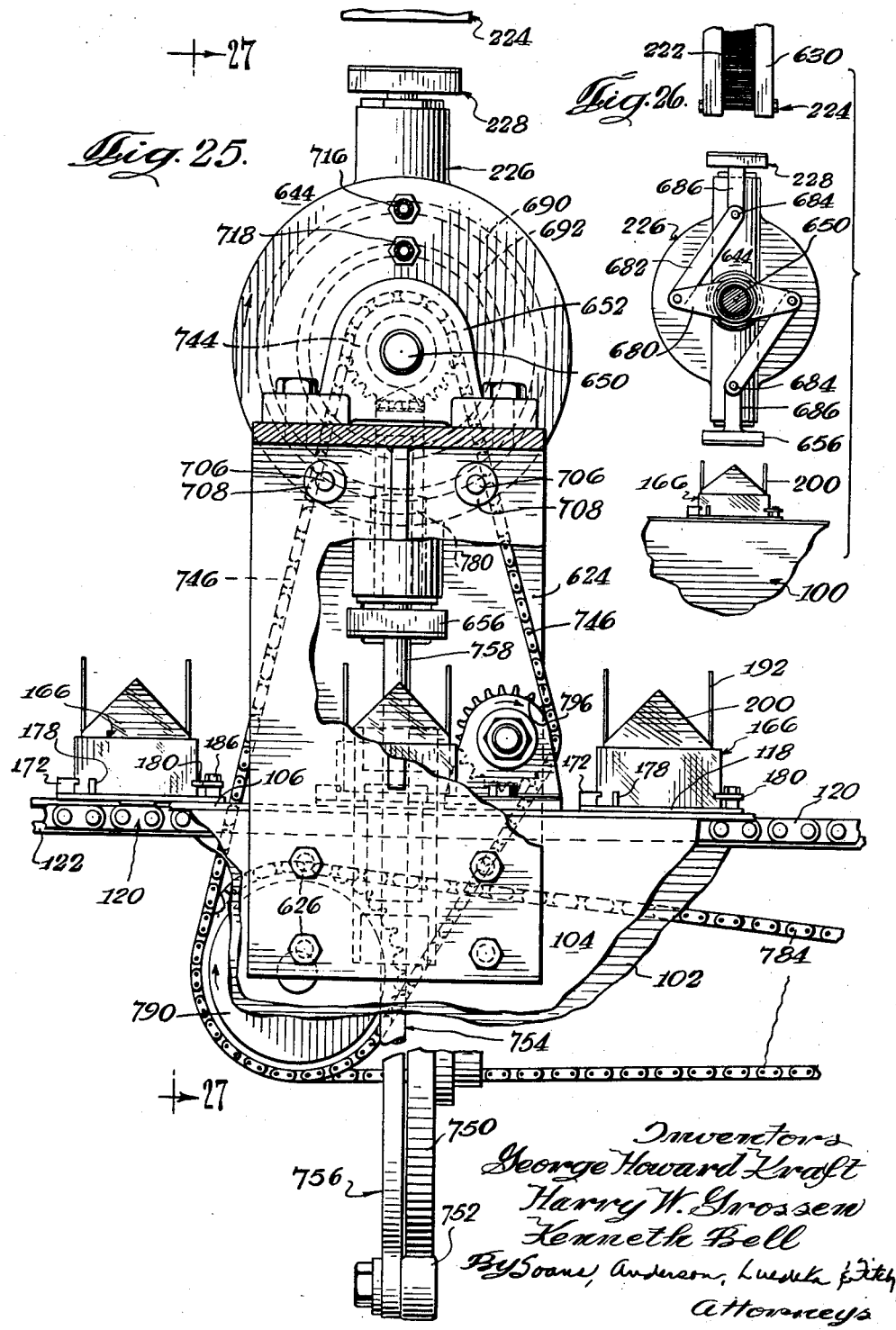

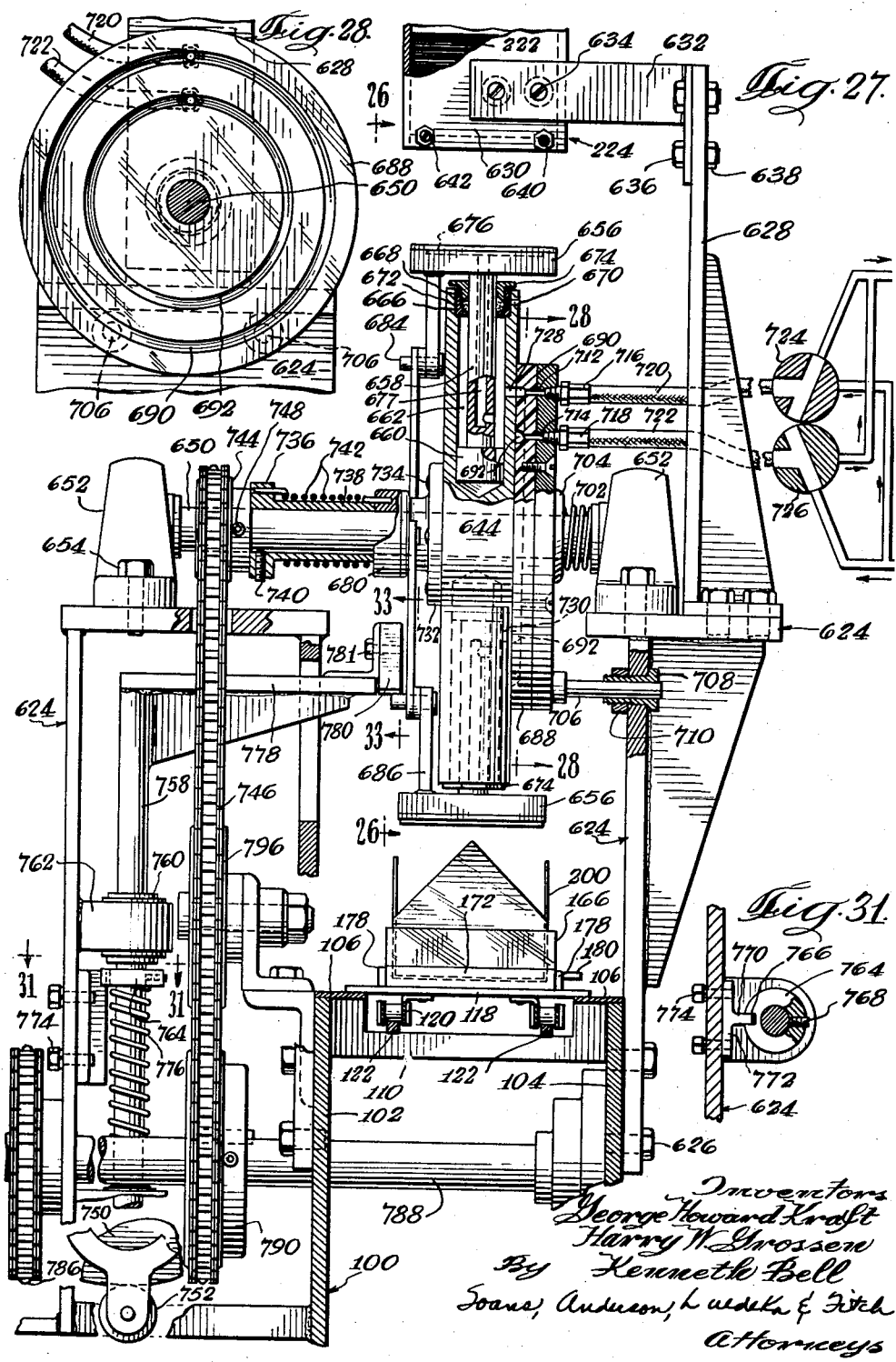

Aug. 16, 1960   G. H. KRAFT ET AL   2,949,372
PACKAGING
Original Filed June 19, 1951   22 Sheets-Sheet 15
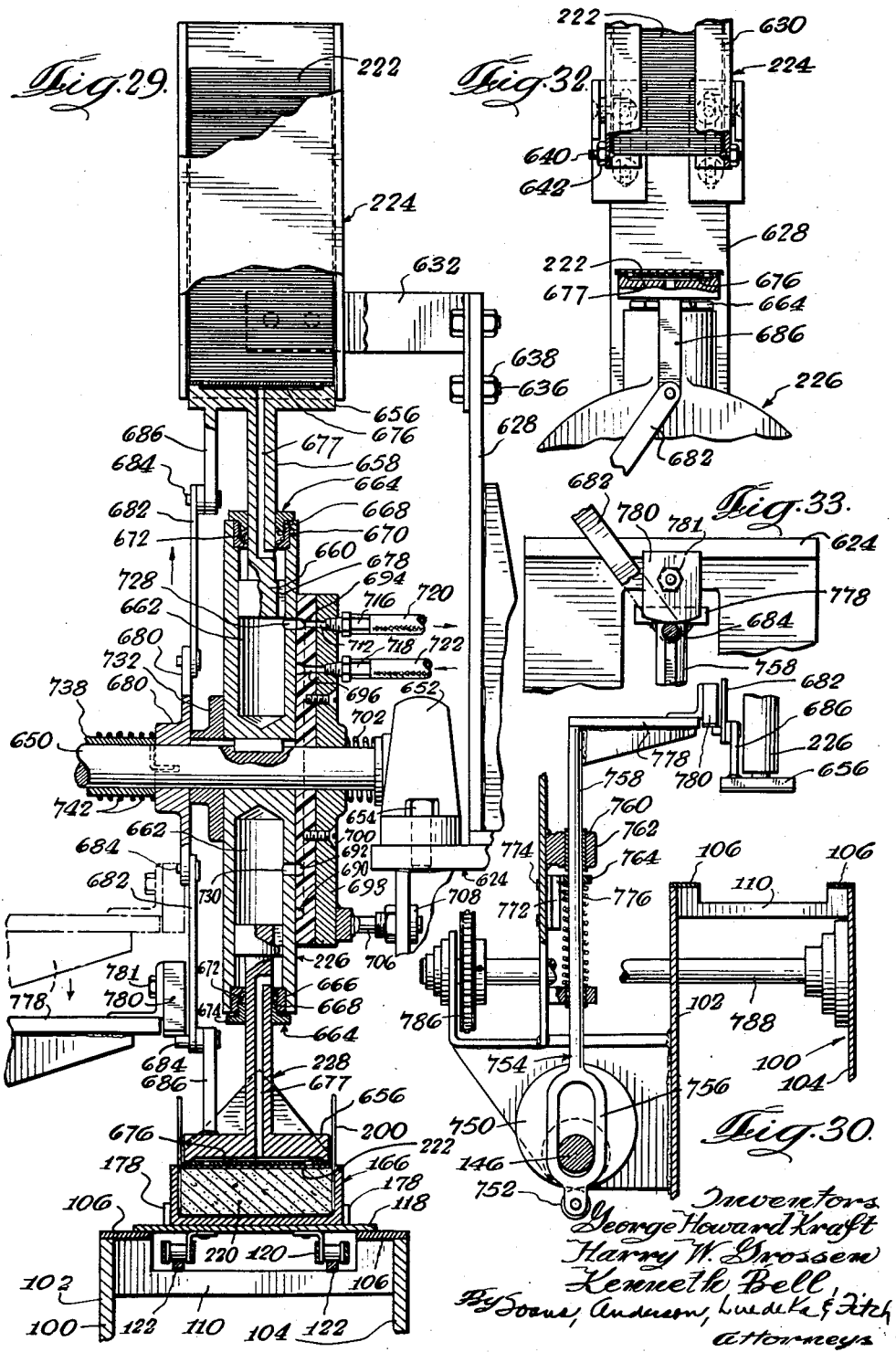
Inventors
George Howard Kraft
Harry W. Grossen
Kenneth Bell
By Soans, Anderson, Luedeka & Fitch
Attorneys

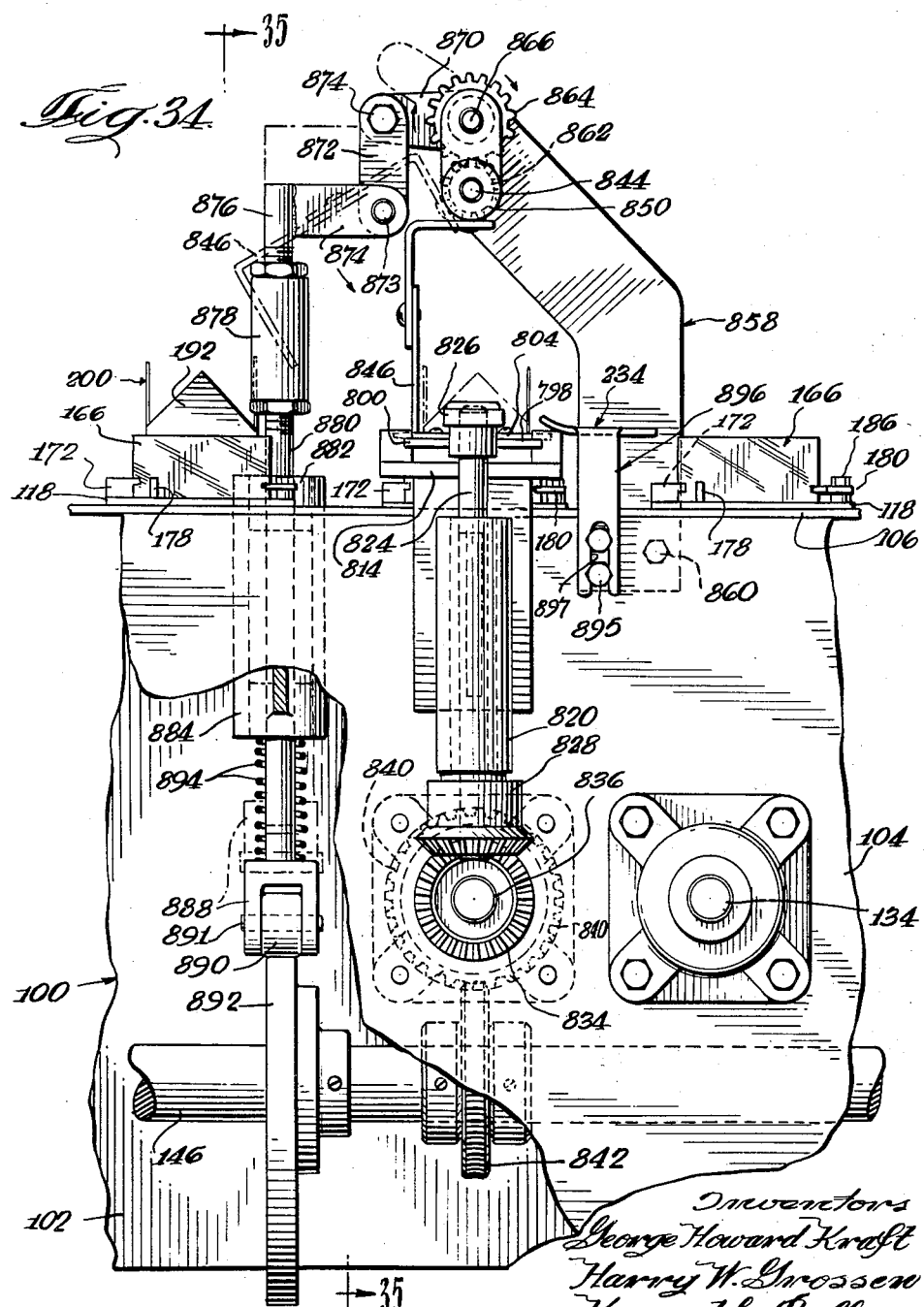

Aug. 16, 1960  G. H. KRAFT ET AL  2,949,372
PACKAGING
Original Filed June 19, 1951  22 Sheets-Sheet 17
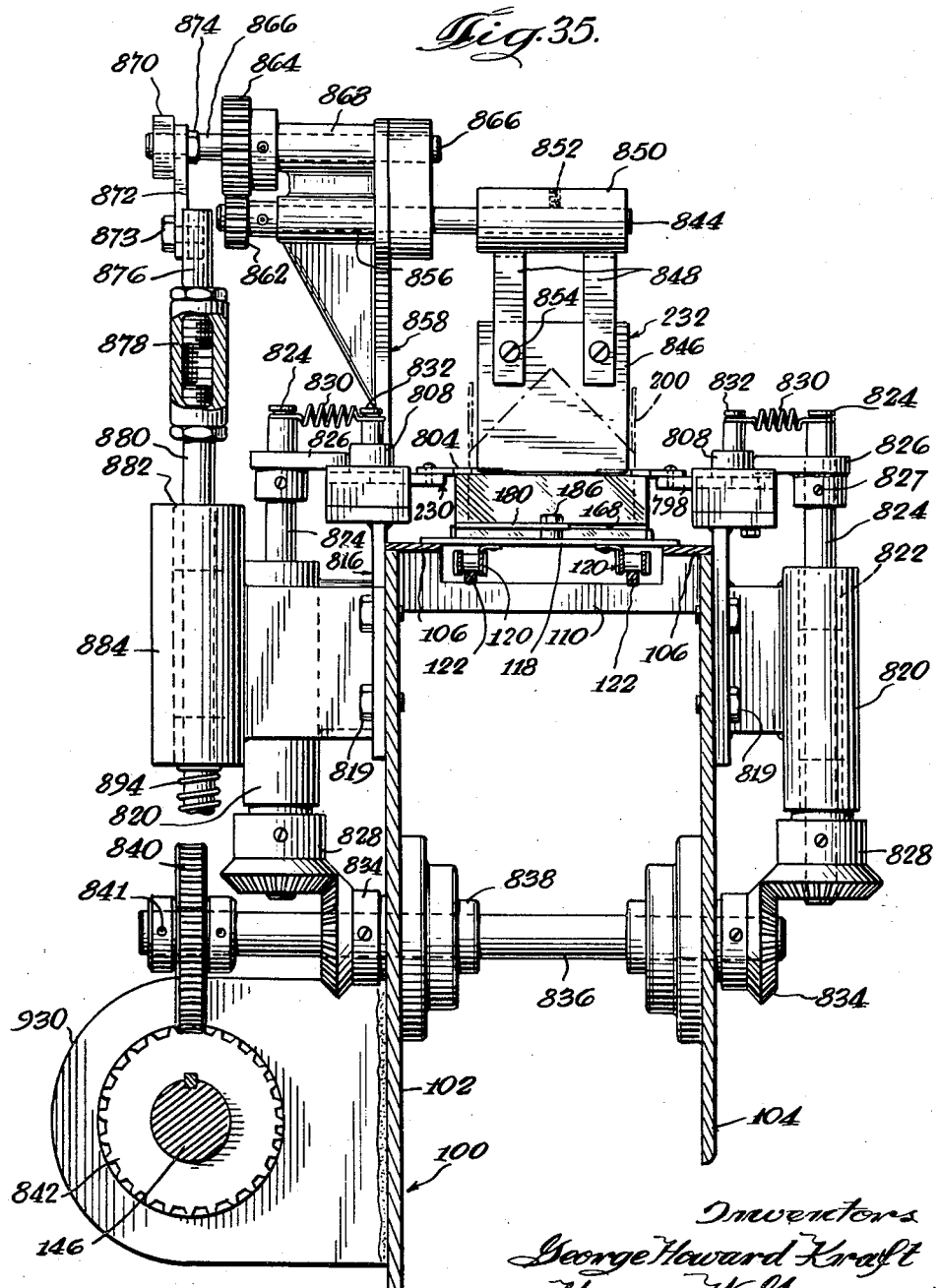

Aug. 16, 1960
G. H. KRAFT ET AL
2,949,372
PACKAGING
Original Filed June 19, 1951
22 Sheets-Sheet 18
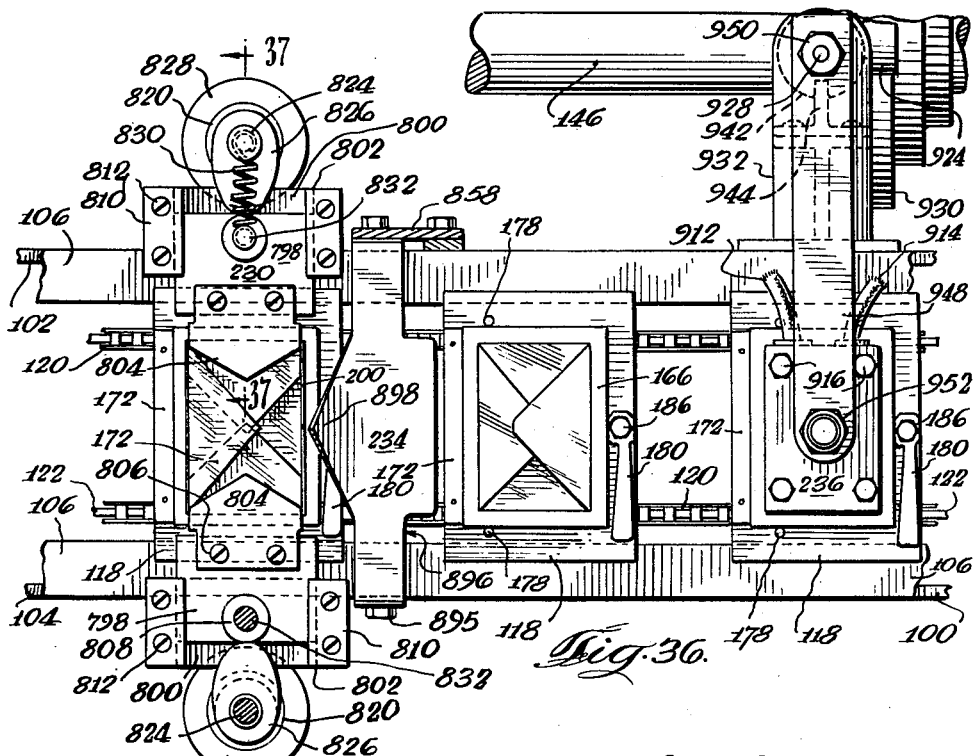
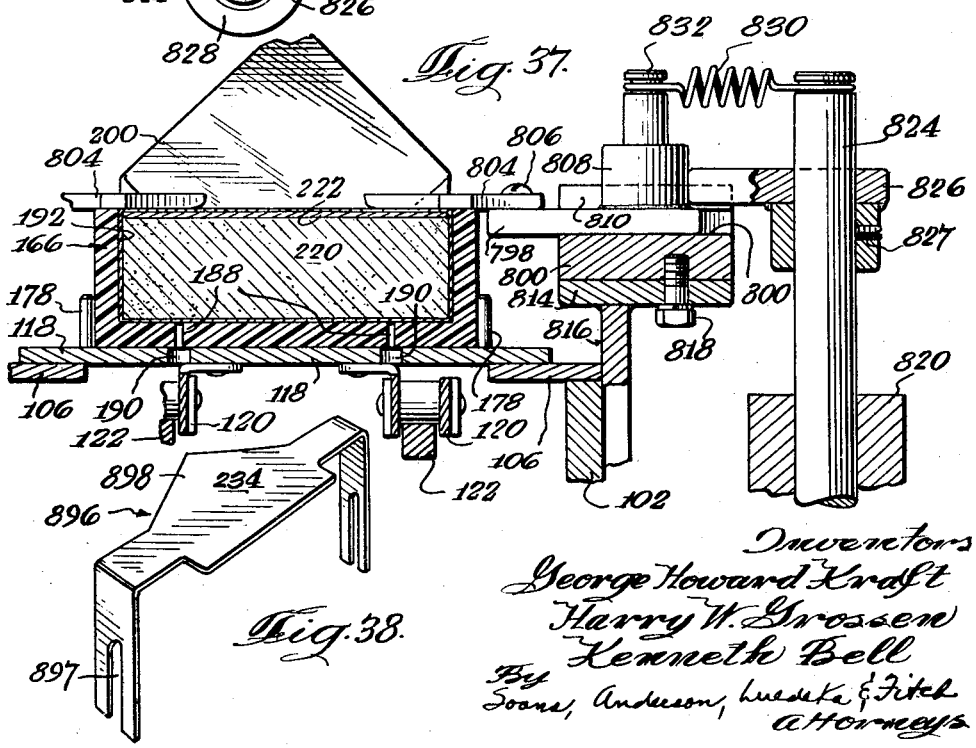
Inventors
George Howard Kraft
Harry W. Grossen
Kenneth Bell
By Soans, Anderson, Luedeka & Fitch
Attorneys

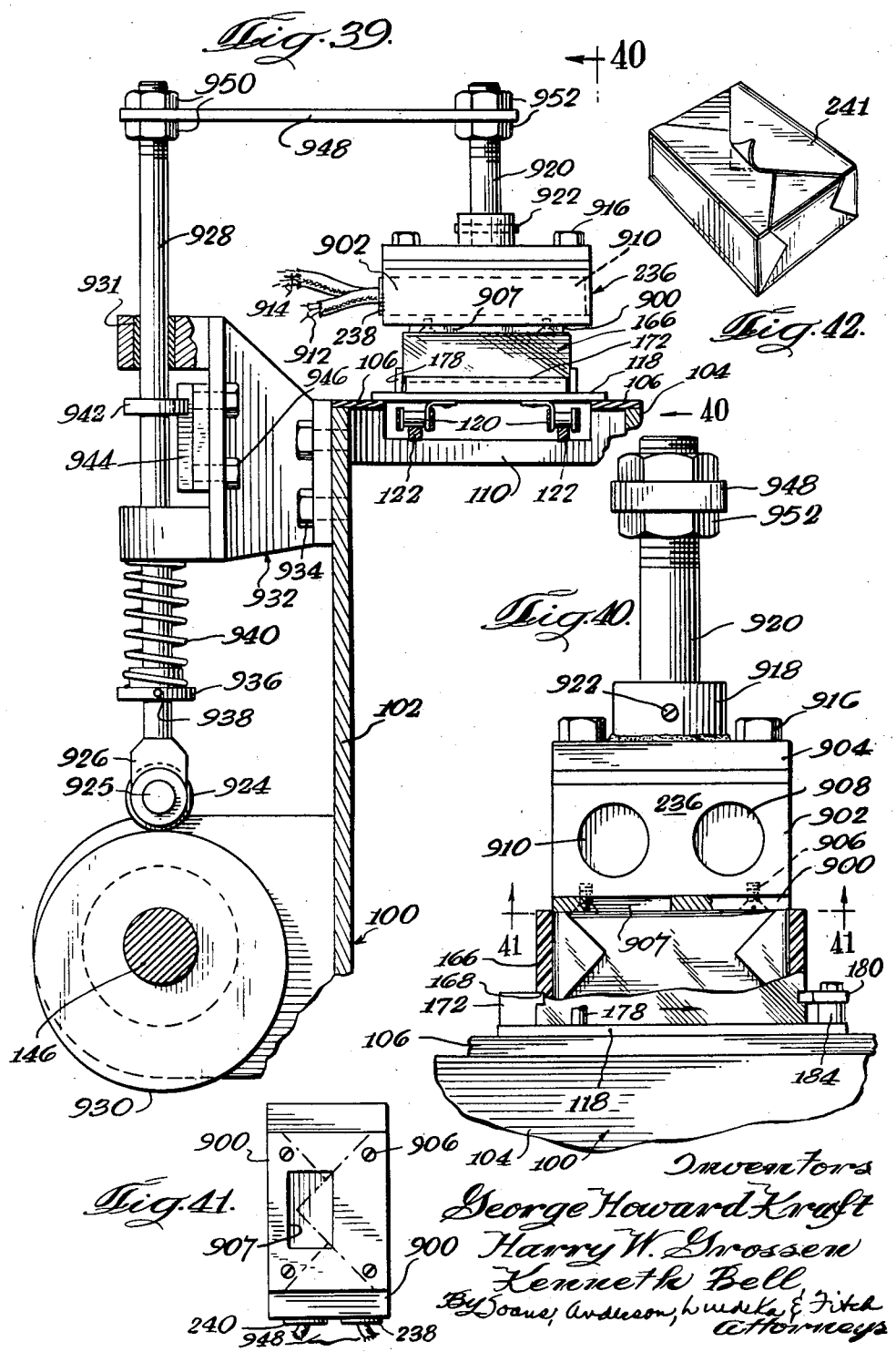

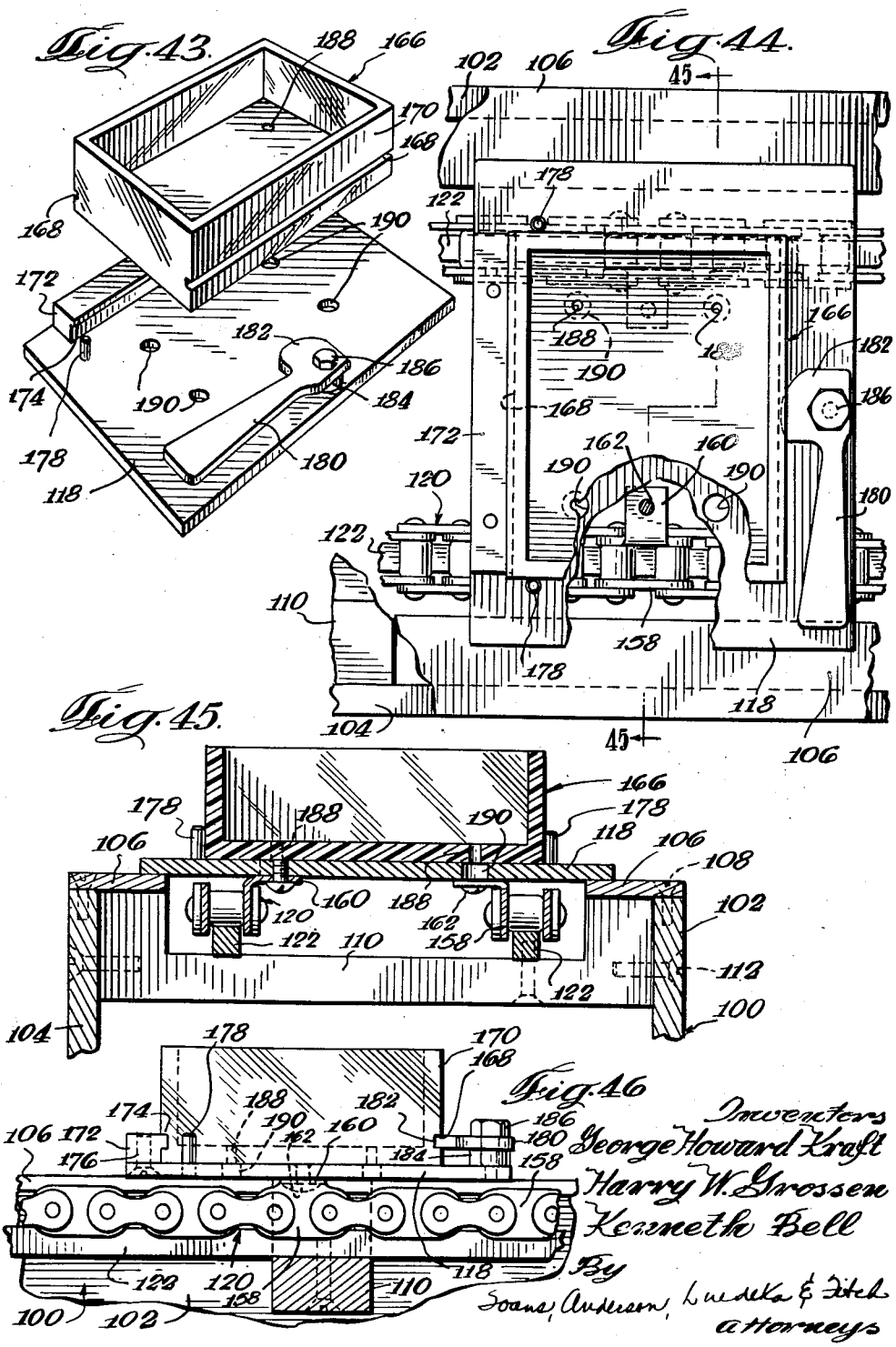

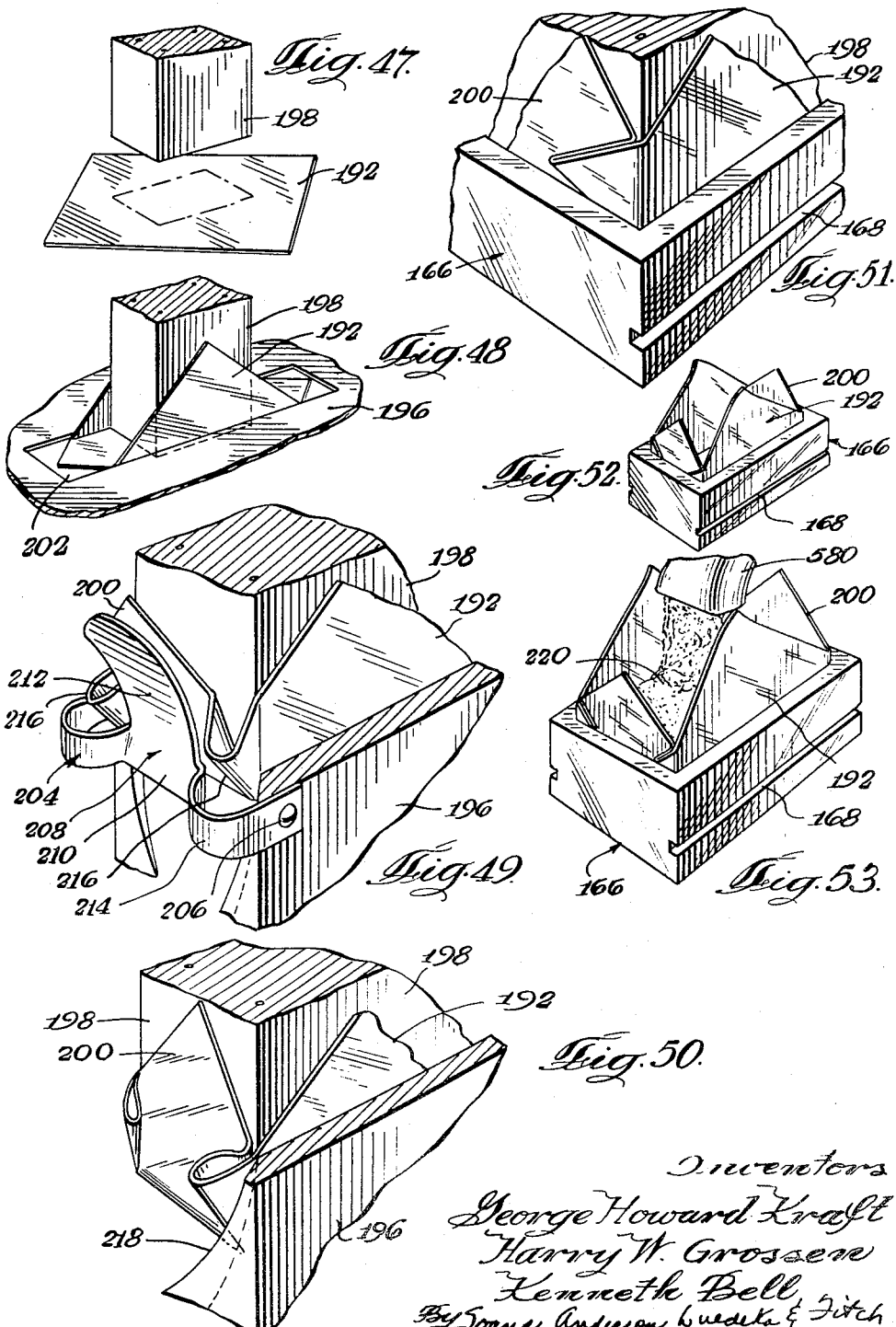

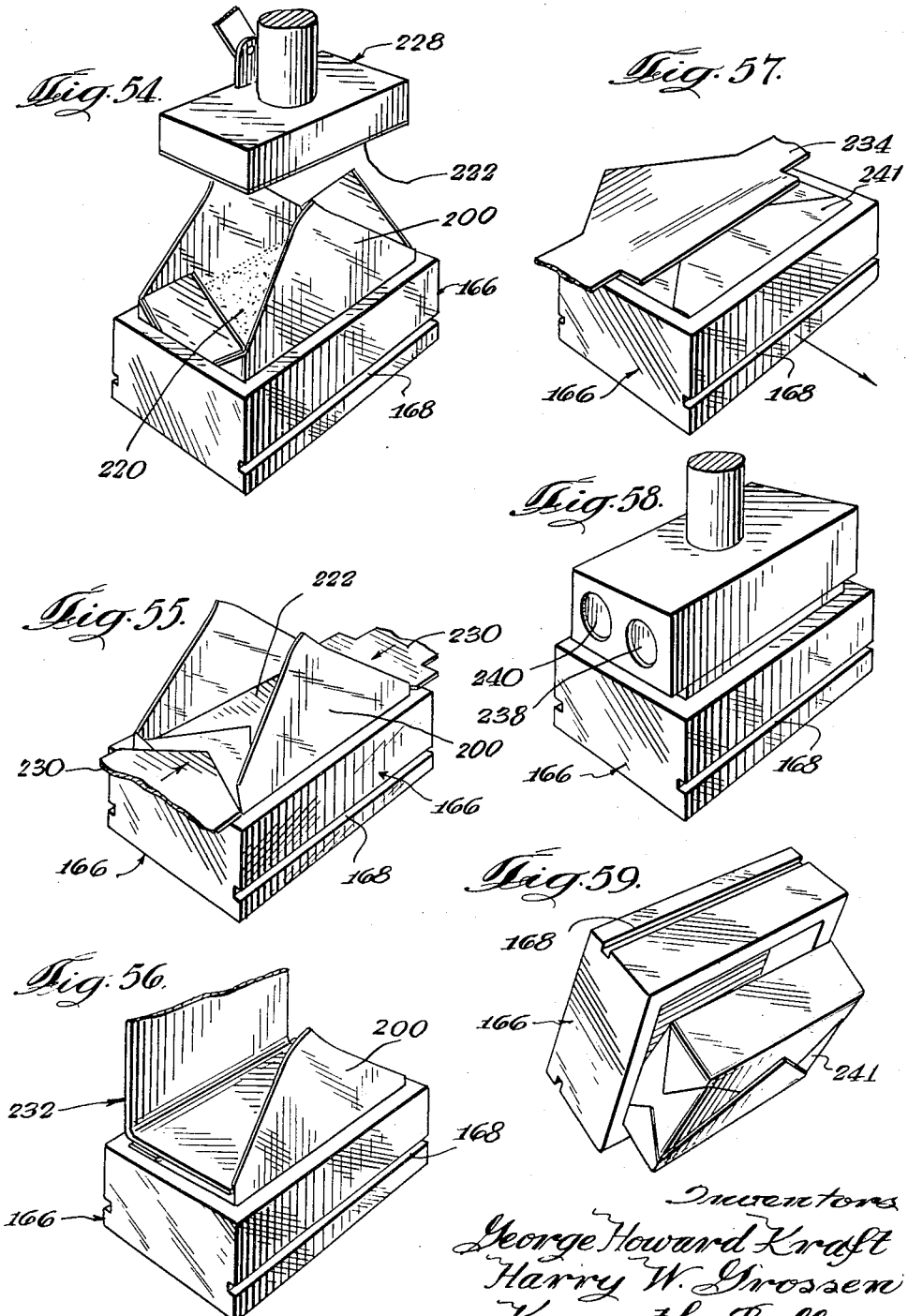

United States Patent Office 2,949,372
Patented Aug. 16, 1960

2,949,372

PACKAGING

George Howard Kraft, Wilmette, Harry W. Grossen, Chicago, and Kenneth Bell, Marengo, Ill., assignors to National Dairy Products Corporation, a corporation of Delaware Original application June 19, 1951, Ser. No. 232,366, now Patent No. 2,790,287, dated Apr. 30, 1957. Divided and this application May 3, 1954, Ser. No. 432,714

2 Claims. (Cl. 99—178)

The present invention, in general, relates to a method of packaging viscous materials, and in particular, to a method for packaging cream cheese which is in a heated, flowable state.

Fresh, or natural, cream cheese, as opposed to process cream cheese, has usually been packaged and distributed in small portions, or pats, which have been individually wrapped in aluminum foil. Before packaging the cheese, it is chilled, worked, and formed into pats by suitable machinery, and these pats are then wrapped in foil. The handling of the cheese and the cold wrapping process make it difficult to exclude bacteria and mold from the package so that the shelf life of the packaged cheese is quite short.

Recently, a method has been devised for making cream cheese by a hot process wherein the finished cheese curd is discharged as a viscous fluid mass at a pasteurizing temperature of 135–170° F. If the heated cream cheese is packaged at a pasteurizing temperature, the keeping qualities of the packaged cheese is enhanced, but no suitable method has been heretofore devised for making a neat, acceptable foil package of the heated cheese. Of course, the cheese can be packaged while hot in a container which lends some mechanical strength to the product, but if the cheese were to be packaged in foil, it had to be first cooled, worked, and formed into pats as in the previous process.

Accordingly, the principal object of the present invention is to provide a method for packaging viscous materials, and particularly cream cheese while in a heated fluid state, in a wrapper such as foil which does not have a substantial amount of mechanical strength. Other objects and advantages of the invention will be apparent from the following description and the accompanying drawings:

In the drawings:

Fig. 1 is a front elevational view of the forward half of an automatic packaging machine embodying various features of the invention and includes a transfer station, a forming station, and a filling station;

Fig. 1a is a front elevational view of the rear half of the packaging machine shown in Fig. 1 and includes an insert transfer station, a folding station, and a sealing station;

Fig. 2 is a plan view of the forward half of the packaging machine shown in Fig. 1;

Fig. 2a is a plan view of the rear half of the packaging machine shown in Fig. 1a;

Fig. 3 is a sectional view taken along line 3—3 of Fig. 2a and shows the drive mechanism for the conveyor of the packaging machine;

Fig. 4 is a plan view of the wrapper transfer mechanism of the packaging machine shown in the preceding figures;

Fig. 5 is a fragmentary elevational view taken generally along line 5—5 of Fig. 4.

Fig. 6 is a sectional view of the wrapper transfer mechanism taken along line 6—6 of Figs. 2 and 4.

Fig. 7 is a sectional view taken along line 7—7 of Fig. 5.

Fig. 8 is a sectional view taken along line 8—8 of Fig. 7.

Fig. 9 is a sectional view taken along line 9—9 of Fig. 7 showing the rack and pinion mechanism associated with the wrapper magazine;

Fig. 10 is a perspective view of the ratchet-pawl drive associated with the wrapper magazine;

Fig. 11 is a perspective view of the ratchet-pinion supporting bracket;

Fig. 13 is a fragmentary sectional view of the needle hold-down mechanism which constitutes a part of the wrapper magazine taken generally along line 13—13 of Fig. 4;

Fig. 14 is a sectional view taken along line 14—14 of Fig. 13.

Fig. 15 is a sectional view taken along line 15—15 of Fig. 1;

Fig. 16 is a sectional view of one of the suction cups associated with the wrapper transfer mechanism taken along line 16—16 of Fig. 15;

Fig. 17 is a sectional view of the forming mechanism taken along line 17—17 of Fig. 4;

Fig. 19 is a perspective view of a folded wrapper as it would appear after being inserted into a container at the forming station;

Fig. 20 is a sectional view of the forming mechanism taken along line 20—20 of Fig. 2;

Fig. 21 is a sectional view of the forming mechanism taken along line 21—21 of Fig. 4 showing the air ejection system for the wrapper transfer mechanism;

Fig. 22 is a sectional view taken along line 22—22 of Fig. 2 showing the main drive and cams for the forming and transfer mechanism;

Fig. 23 is a sectional view of the filler mechanism shown in filling position taken along line 23—23 of Fig. 1;

Fig. 24 is a sectional view of the lower end of the filler mechanism similar to Fig. 23 showing the filler mechanism in a raised position;

Fig. 25 is an elevational view of the insert transfer mechanism;

Fig. 26 is a sectional view of the insert transfer mechanism taken along line 26—26 of Fig. 27;

Fig. 27 is a sectional view taken along line 27—27 of Figs. 25 and 1a showing the control mechanism for the insert transfer mechanism;

Fig. 28 is a sectional view taken along line 28—28 of Fig. 27;

Fig. 29 is a sectional view similar to Fig. 27 showing the insert transfer arms in extended position;

Fig. 30 is a sectional view illustrating the cam drive mechanism which operates the transfer arms of the insert transfer mechanism;

Fig. 31 is a sectional view taken along line 31—31 of Fig. 27;

Fig. 32 is an elevational view showing the insert magazine mechanism;

Fig. 33 is a sectional view taken along line 33—33 of Fig. 27;

Fig. 34 is a side elevational view of the folding mechanism of the packaging machine;

Fig. 35 is a sectional view taken along line 35—35 of Figs. 34, 1a, and 2a;

Fig. 36 is a plan view of the folding mechanism;

Fig. 37 is a sectional view taken along line 37—37 of Fig. 36.

Fig. 38 is a perspective view of the stationary folding arm associated with the folding mechanism;

Fig. 39 is a sectional view of the sealing mechanism taken along line 39—39 of Figs. 1a and 2a;

Fig. 40 is a side elevational view of the sealing mechanism taken along line 40—40 of Fig. 39;

Fig. 41 is a sectional view taken along line 41—41 of Fig. 40;

Fig. 42 is a perspective view of the finished cheese package;

Fig. 43 is a perspective view of one of the containers and a conveyor plate associated with the conveyor of the packaging machine;

Fig. 44 is a plan view, partly in section, showing a part of the conveyor including a container and conveyor plate attached to the conveyor chains;

Fig. 45 is a sectional view taken along line 45—45 of Fig. 44;

Fig. 46 is a side elevational view showing a container and conveyor plate attached to the conveyor;

Fig. 47 is a diagrammatic view showing the forming block positioned above the wrapper;

Fig. 48 is a diagrammatic view showing the forming block entering the forming die and illustrating the initial folds of the wrapper;

Fig. 49 is a diagrammatic view showing the forming block as it passes through the forming die and forming shoe and illustrates the further folding of the wrapper;

Fig. 50 is a diagrammatic view showing the folding of the outwardly extending end flaps of the wrapper as the forming block continues its movement through the forming die;

Fig. 51 is a diagrammatic view showing the open receptacle formed from the wrapper being inserted into the container by the forming block;

Fig. 52 is a diagrammatic view showing the folded wrapper which has been shaped into an open-topped receptacle in position within the container;

Fig. 53 is a diagrammatic view showing molten cream cheese being inserted within the open wrapper package in the container;

Fig. 54 is a diagrammatic view showing an insert being placed in the open-topped receptacle formed from the wrapper;

Fig. 55 is a diagrammatic view showing the folding blades moving over the top of the container and folding the transverse flaps of the open receptacle;

Fig. 56 is a diagrammatic view showing one of the longitudinal flaps of the open receptacle being folded parallel to the top of the container;

Fig. 57 is a diagrammatic view showing the container as it moves beneath the stationary folding arm;

Fig. 58 is a diagrammatic view showing the sealer in position on top of the container; and Fig. 59 is a diagrammatic view showing the completed cheese package being discharged out of the container.

Figure 18:
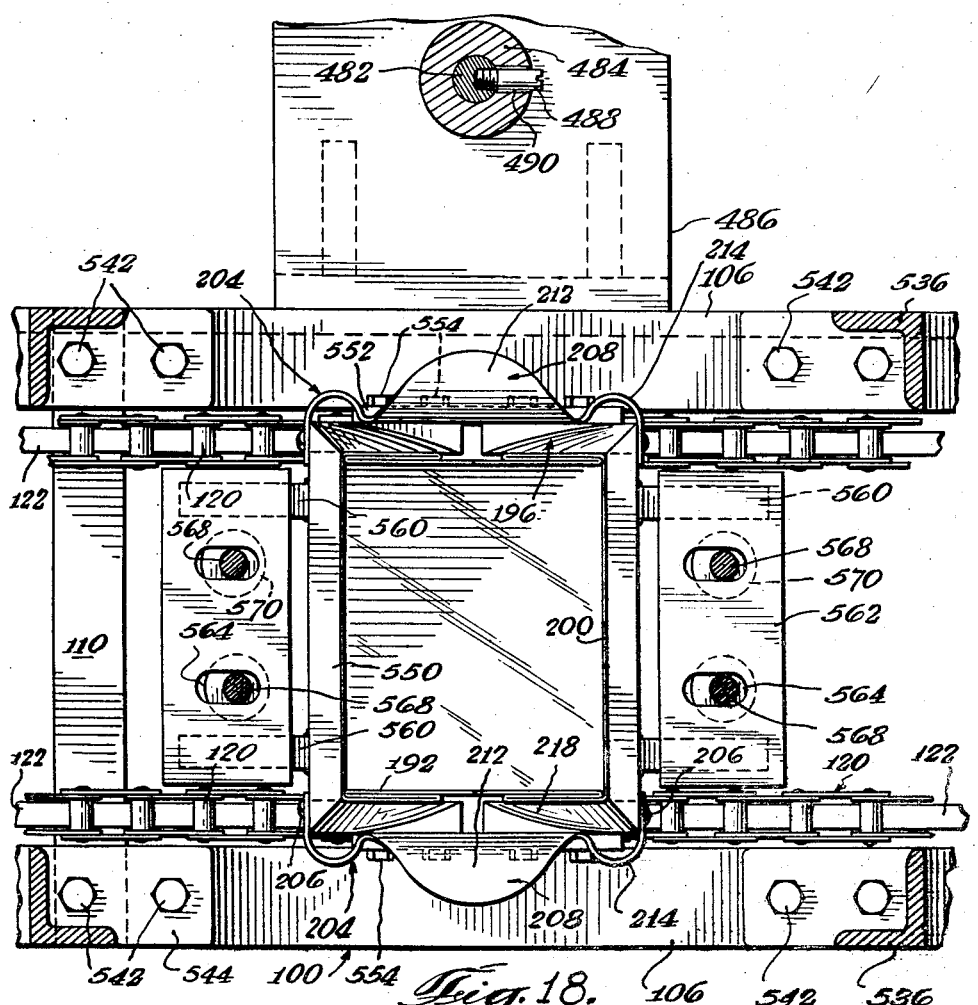
Fig. 18 is a plan view of a forming mechanism taken along line 18—18 of Fig. 17.

The illustrated packaging machine is designed to perform the following operations:

(1) Transforming a flat, flexible wrapper into an open-topped receptacle having upwardly extending side walls;

(2) Filling the open receptacle with a predetermined quantity of flowable material, e.g. heated fluid cream cheese;

(3) Inserting a flat, relatively rigid insert on the upper surface of the cheese within the open receptacle;

(4) Folding the upwardly extending side walls of the open receptacle to a horizontal position on the upper surface of the flat insert so as to bring the upper portions of the side walls into face-to-face contact to form a closed package;

(5) Adhesively securing the overlapping side walls of the closed package by the application of heat and pressure so as to form a sealed package; and (6) Discharging the sealed package from the packaging machine.

Referring to the drawings (see Figs. 1, 1a, 2, 2a, and 45), the packaging machine illustrated therein includes a main frame 100 which supports all of the operating elements of the packaging machine. The frame 100 is suitably fabricated from stainless steel, or the like, and includes longitudinally extending, vertically-disposed plates 102 and 104, a narrow, horizontally extending top-plate 106 attached to each of the plates 102 and 104 by suitable means such as screws 108, a plurality of transverse cross members 110 extending between the side plates adjacent their upper ends and attached thereto by suitable means such as screws 112, and vertical legs 114 which are rigidly attached to the side plates, as by welding or the like.

An endless conveyor 116 which moves around a closed path on the frame 100 carries spaced-apart conveyor plates 118 to a consecutive series of operating stations on the machine. The endless conveyor 116 includes a pair of parallel conveyor chains 120 disposed at spaced relation, which move along longitudinally extending rails 122 on the upper surface of the transverse cross members 110 around the sprockets 124 and 126 located adjacent the ends of the frame 100 and around guide sprockets 128 located on the lower run of the conveyor chains. The sprockets 124, 126, and 128 are suitably mounted for rotation on shafts 130, 132, and 134, the same being suitably supported in brackets or bearings and a supporting frame, as shown in the drawings.

The power for driving the conveyor 116 and the other operating mechanisms in the packaging machine is derived from the motor M through a suitable power transmission means. The conveyor 116 is intermittently driven by the Geneva drive 136 which moves the conveyor a predetermined distance for every 180° rotation of the Geneva drive wheel 138. The motor M drives a main drive shaft 140 at a predetermined rate of speed. A bevel gear 142 on the shaft 140 meshes with a bevel gear 144 on a longitudinally extending shaft 146 so that the shaft 146 rotates with the shaft 140. A second bevel gear 148 on the shaft 146 meshes with a bevel gear 150 on a transverse shaft 152 which carries the Geneva drive wheel 138 so that the shaft 152 and the wheel 138 rotate simultaneously with the rotation of the shafts 146 and 140. The shafts 140, 146, and 152, as are the rest of the shafts on the packaging machine, are supported in suitable brackets or bearings as shown in the drawings.

The Geneva drive 136 is comprised of the drive wheel 138 which intermittently turns the driven wheel 154 on the shaft 130. The step-by-step rotation of the driven wheel 154 is transmitted to the conveyor chains 120 by the sprockets 124 on the shaft 130.

Each conveyor chain 120 is equipped with a series of special, spaced-apart chain links 158 having horizontally extending lug portions 160 which are adapted to be connected to the bottom of the conveyor plates 118 by screws 162, (Figs. 43 to 46). Each of the conveyor plates 118 is centrally positioned on the conveyor 116 with the longitudinal axis of the conveyor plates lying transverse to the line of motion of the conveyor 116. The conveyor plates 118 are connected to the conveyor chains 120 along lines parallel to the longitudinal axis of the plates 118. Since each of the conveyor plates 118 is attached to the conveyor 116 along a line which is transverse to the direction of motion of the conveyor 116, the conveyor plates 118 are able to turn around the sprockets 124 and 126 at the ends of the packaging machine. The top-plates 106 which are adapted to support the sides of the conveyor plates 118 are appropriately cut away, as shown at 164, so as not to interfere with the turning of the conveyor plates 118 around the sprockets 124 and 126.

A rigid, open-topped, rectangular mold or container 166, which may be fabricated out of plastic or the like, is releasably secured to the upper surface of each of the conveyor plates 118. The containers 166 are positioned on the conveyor plates 118 so that they are centered on the conveyor 116 with their longitudinal axis transverse to the direction of motion of the conveyor 116. A portion of the conveyor assembly, including a means for connecting the containers 166 to the conveyor plates 118, is particularly shown in Figs. 43 through 46.

The containers 166 are proportioned so that their inside dimensions correspond to the outer dimensions which one desires in the final cream cheese package. Thus, when a cream cheese package is inserted into the container 166, the package completely fills the container 166 with the upper surface of the cream cheese package lying in the plane of the upper surface of the container 166.

The means for releasably securing the containers 166 to the conveyor plates 118 includes the horizontally extending grooves 168 located along the outer face of each of the longitudinally extending sides 170 of the containers 166. A generally rectangular-shaped, longitudinally extending, transverse stop member 172 having an outwardly extending tongue member 174 is proportioned to interfit with one of the grooves 168 in the container 166 and is connected to the conveyor plates 118 by the screws 176. When the stop member 172 is properly positioned on the conveyor plate 118, the tongue member 174 extends inwardly towards the center of the conveyor plate 118 at the same height as the grooves 168 in the container 166 when the container 166 is seated on the conveyor plate 118. Thus, when the container 166 is seated on a conveyor plate, it can be slid along the plate so as to interfit the tongue 174 into one of its longitudinal grooves 168.

Vertical pins 178 on the conveyor plate 118 restrain the container 166 from moving longitudinally on the conveyor plate 118 when the container 166 is properly positioned on the conveyor plate 118 with one of the grooves 168 of the container 166 interfitting with the tongue 174 of the stop member 172. In order to securely lock the container 166 in position on the conveyor plate 118, a rotatable locking member 180 having a cam section 182 which is proportioned to interfit into the grooves 168, is rotatably mounted on the conveyor plates 118 above a suitable washer 184 by a bolt 186. The washer 184 spaces the cam section 182 from the conveyor plate 118 so that the cam section 182 is at the same height as the grooves 168 of the containers 166 when the container 166 is seated on a conveyor plate 118. The locking member 180 is properly spaced from the stop member 172 so that when the container 166 is positioned on the conveyor plate 118 with one of the longitudinal grooves 168 interfitting with the tongue 174 of the stop member 172, the rotation of the locking member 180 about the axis of the bolt 186 will cause the cam section 182 to enter the groove 168 on the side 170 of the container 166 opposite the stop member 172. The frictional engagement between the cam 182 and the groove 168 will be sufficient to prevent the cam 182 from rotating independently of the manual manipulation of the locking member 180. When the container 166 is locked in position in the manner described, it will be restrained from longitudinal movement along the conveyor plate by the pins 178 and from transverse movement by the stop member 172 and the locking member 180.

In order to prevent a cream cheese package from sticking to the interior of the container 166 when the container is inverted, four, suitably-spaced holes 188 extend through the base of the container 166 so as to permit air to enter the space which appears between the cream cheese package and the base of the container 166 when the cream cheese package begins to slide out of the container 166. Additional slightly larger holes 190 are located in the conveyor plate 118 below and directly in line with the holes 188 in the container 166 so as to allow the air to freely enter the container 166.

In the operation of the packaging machine the conveyor 116 carries the containers 166 to the various operating stations of the packaging machine where the steps in the packaging process are carried through. The action of the various operating stations of the packaging machine on a flexible wrapper 192 will be briefly described in order to facilitate an understanding of the improved packaging method and of the mechanical construction of the packaging machine of the present invention.

The flexible wrapper for packaging cream cheese is preferably comprised of a double sheet of tissue paper separated by a layer of wax bonded to an aluminum foil sheet. A wrapper of this type is admirably adapted to the making of a hermetically-sealed package since such coating material is impervious to moisture and is adapted to be effectively sealed around the package content. Hence, such wrapper material is especially suited to the packaging of food products which should be preserved against the loss or absorption of moisture.

The conveyor first carries an empty container 166 to a wrapper transfer and forming station A where the flat, rectangular-shaped, flexible, aluminum foil wrapper 192 is transferred from the wrapper magazine 194 to the upper surface of an appropriately designed forming member, or die, 196. A forming block 198 then descends on the wrapper 192 forcing the wrapper through the die 196 and into the container 166. As the wrapper moves through the forming die 196, it is transformed into the form of an open receptacle 200. The various stages through which the wrapper passes in its journey through the forming die 196 are diagrammatically illustrated in Figs. 47 through 52.

In particlular, the forming block 198 is in the shape of a rectangular parallelepiped and is adapted to reciprocate in a vertical direction through the forming die 196. The horizontal, cross-sectional area of the forming block 198 is the same as that desired in the interior of the final cheese package. The forming die 196 is shaped in an appropriate manner so as to fold the wrapper into the form of an open receptacle 200 around the contours of the forming block 198 when the forming block passes through the forming die 196.

When the forming block 198 is positioned above the forming die 196, the wrapper 192 is placed horizontally on the upper surface of the forming die 196 so that the axes of the base of the forming block 198 are superimposed over the diagonals of the foil wrapper 192. This position is diagrammatically shown in Fig. 47.

The upper portion of the forming die 196 has a rectangular opening 202 having a width substantially equal to the width of the forming block 198 plus twice the thickness of the wrapper 192 and of a length substantially greater than the diagonal length of the wrapper 192. As the forming block 198 descends on the wrapper 192 which is positioned at the upper surface of the forming block 198 in the position described, the forming block 198 forces the wrapper 192 downward through the forming die 196, as shown in Fig. 48. As the forming block descends through the upper portion of the forming die 196, the portion of the wrapper 192 lying outside of the rectangular opening 202 is creased and folded along lines formed by the longitudinal edges of the forming block 198. As the forming block 198 continues its downward motion through the forming die 196, it passes adjacent a pair of forming shoes 204 which are rigidly attached to the main body of the forming die by screws 206, as shown in Fig. 49. The forming shoes 204 are designed to engage the outwardly extending sections of the wrapper 192 as the wrapper is moved through the forming die 196 by the forming block 198 and to fold the outwardly extending sections of the wrapper along the transverse edges of the forming block 198, as shown in Fig. 49. The forming shoes 204 include a central, horn-shaped section 208 which has a flat, vertical base portion 210 and an upwardly extending portion 212 which curves outwardly from the base portion 210. The forming shoes 204 also include the outwardly extending arcuate sections 214 (Fig. 49) which are located adjacent either side of the central, horn-shaped section 208 and which are adapted to admit the outwardly extending pleats, or ears, 216 formed at the corners of the forming block 198 by the above operations as the forming block moves through the upper portion of the forming die 196 including the forming shoes 204.

The lower portion of the forming die 196, located below the forming shoes 204, is appropriately shaped, as shown in Figs. 49 and 50, and includes the curved portions 218 which are adapted to engage the outwardly extending pleats 216 and to fold the pleats 216 against the transverse sides of the forming block 198 as the block moves through the lower portion of the forming die 196.

A container 166 is positioned directly below the forming die 196 and is proportioned so as to admit the forming block 198 and the wrapper 192, as seen in Fig. 51. The forming block 198 continues its downward movement until it rests on the bottom of the container 166. The forming block 198 then reverses direction and recedes from the container 166, leaving the wrapper 192 positioned within the interior of the container 166. At this point, the wrapper 192 lines the container 166 and is in the shape of an open rectangular box 200 having side walls which include upwardly extending sections which constitute top flaps. This position is shown in Fig. 52.

The container 166 and the open-topped receptacle 200 are then moved by the conveyor to a filling station B where a predetermined amount of heated, fluid cream cheese 220, which is sufficient to fill said open receptacle 200 substantially to the level of the walls of the container 166, is deposited within the open receptacle 200. This operation is diagrammatically shown in Fig. 53.

The container 166, which now includes the cheese-filled, open receptacle 200, is next moved to an insert transfer station C where a reciprocating insert transfer mechanism removes a relatively rigid sheet insert 222, e.g. a sheet of waxed paper, from a storage magazine 224 and places the insert 222 on the upper surface of the cream cheese 220 within the open package 200. During this operation, the insert transfer mechanism presses the insert 222 against the surface of the cheese 220 to level the surface of the cheese before it releases the insert 222. The insert 222 is rectangular in shape and has the same dimensions as the inner horizontal, cross-sectional area desired in the cream cheese package. The purpose of insert 222 is to furnish a rigid medium over which the upwardly extending flaps of the wrapper 192 can subsequently be folded.

More particularly, the transfer mechanism includes a rotatable body section 226 and a pair of reciprocating arm members 228 which extend outwardly from the rotatable body section 226 (Fig. 25). The reciprocable arm members 222 operate simultaneously so that while one arm member 228 moves outwardly and upwardly so as to engage an insert 222 at the insert storage magazine 224, the other arm member 228 which had previously picked up an insert 222 moves outwardly and downwardly from its original position above the upstanding flaps of the wrapper 192 until it presses its insert 222 against the upper surface of the cheese 220 within the open package 200. At the extended positions of the arm members 228, the upwardly extending arm member which is adjacent the insert storage magazine 224 picks up the bottommost insert 222, whereas the arm member 228 adjacent the cheese 220 within the open receptacle 200 releases its insert 222 so that the insert rests on the surface of the cheese 220. The arm members 228 then retract to their initial starting positions. During the next movement of the conveyor, the body section 226 rotates 180° so as to properly position the arm members 228 for repetition of the above-described operation, and simultaneously, the next container 166 is positioned in the transfer station. It is understood above that when a reciprocating arm member 228 places an insert 222 within the foil wrapper 192, the arm 228 does not contact the upstanding flaps of the foil wrapper 192. Fig. 54 diagrammatically illustrates the placing of an insert 222 on the surface of the cheese 220.

The conveyor then moves the container 166 and its contents to a folding station D where horizontal, reciprocating, folding members 230, which are of the same width as the insert 222, move inwardly against the transverse ends of the container 166 along the longitudinal axis of the container 166. The upwardly extending flaps of the receptacle which lie along the inner transverse sides of the container 166 are folded by the action of the reciprocating folding members 230 along the upper surface of the insert 222, as shown in Fig. 55. As the folding blades 230 are retracted from the upper surface of the container 166, an oscillating folding arm 232 moves inwardly over one of the longitudinal sides of the container 166. During its movement, the oscillating arm 232 folds one of the longitudinally extending, upstanding flaps of the open receptacle 200 so that the flap lies along the plane of the upper surface of the container 166, as shown in Fig. 56. While the oscillating arm 232 is in the position shown in Fig. 56, the conveyor 116 moves the container 166 forwardly towards the next station. As the container 166 starts its forward motion, it passes beneath the horizontally-positioned, stationary arm 234 which folds the last upstanding flaps of the flexible wrapper 192 so as to superimpose that flap over the previously-folded flap in the plane of the upper surface of the container 166. As shown in Fig. 57, the stationary arm 234 is positioned so that its lower surface slidably engages the upper surface of the container 166 as the container passes below the arm.

The conveyor 116 moves the container 166 and the folded or closed cheese package to a sealing station E. At the sealing station E, a reciprocating, heated sealing unit 236, including a heating element 238 and a control element 240, moves downward until the lower surface of the sealing unit 236 engages the closed upper surface of the cheese package which is defined by the contours of the foil wrapper 192. The sealing unit 236 is at a temperature of about 180° F., which is sufficient to make the wax which is present within the flexible wrapper 192 tacky and to adhesively bind the upper layer of the wrapper 192 to the adjacent overlying wrapper surface. After the sealing unit 236 remains in contact with the upper surface of the cheese package for a sufficient length of time so as to cause the overlapping flaps of the package to adhere to each other, the sealing unit 236 rises back to its original retracted position. The container 166, which now includes a wrapped and sealed cream cheese package 241, is then finally moved by the conveyor 116 around the sprocket 124 until the container 166 arrives at the inverted position shown in Fig. 59. At this position, the sealed cream cheese package 241 falls out of the container 166 onto a moving belt 242 which carries the sealed cream cheese package 241 from the packaging machine.

Referring in detail to the packaging machine disclosed in the drawings, the wrapper transfer and forming station A includes a wrapper feeding mechanism, a wrapper transfer mechanism, and a forming mechanism.

*Wrapper feeding mechanism*

Figure 12:
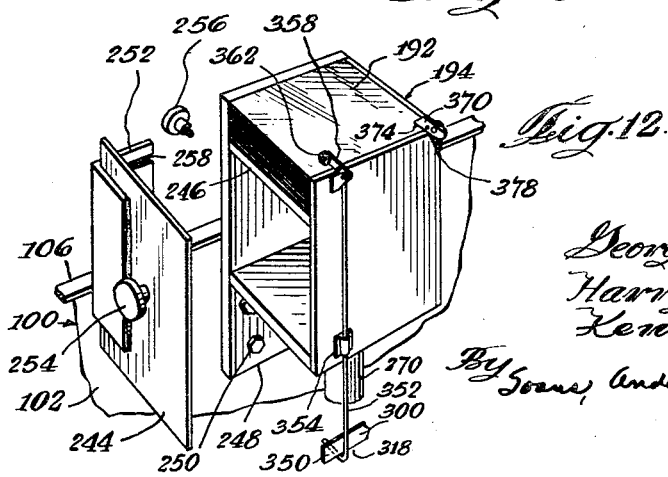
Fig. 12 is a perspective view of the wrapper magazine housing with a side panel separated from the housing.

The wrapper feeding mechanism of the packaging machine is particularly shown in Figs. 1, 4, 5, and 7 through 14. The wrapper feeding mechanism includes an open-topped magazine housing 194 having a removable side panel 244, a vertically-slidable, horizontally-disposed platform 246 within the housing 194, a drive means for moving the platform within the housing, a means for preventing the platform from rising within the housing when the flexible wrappers 192 extend to the top of the magazine housing 194, and a hold-down means which prevents more than one wrapper 192 from being removed from the top of the magazine housing 194 during a single cycle of the transfer mechanism.

The magazine housing 194 is proportioned to hold a stack of flexible wrappers 192 and includes a back plate 248 which is attached to the frame of the packaging machine, as by bolts 250. A removable side panel 244 having a side flange 252 and an outwardly extending, knurled handle 254 is adapted to be attached to the magazine housing 194 by a removable screw 256 which extends through a slot 258 in the side flange 252 and into the back plate 248 of the magazine housing 194.

A vertically-movable platform 246 is positioned within the interior of the magazine housing 194. A collar 262 is centered on the bottom of the platform 260 and fixedly attached thereto. A vertically extending rack 264 which is rigidly connected to the collar 262 by a pin 266 extends downwardly through the base of the magazine housing 194 and through a downwardly extending bearing member 268 within a vertically-disposed cylindrical sleeve 270. The sleeve 270 is connected to a supporting bracket 272 which is fixedly attached to the magazine housing 194.

The vertical movement of the platform 260 is controlled by a pinion 274 which engages the vertically extending rack 264. The pinion 274 is fixedly positioned on a shaft 276 which is journalled in bearings 278 which are located within the arms of a supporting bracket 280. The bracket 280, which is illustrated in Fig. 11, is fixed to the packaging machine frame 100 by screws 282. The vertical sleeve 270 and the bearing member 268 are appropriately cut away at 284 so as to permit the pinion 274 to engage the rack 264. Two collars 286 and 288 which are secured to the shaft 276, as by the screws 290 and 292, keep the pinion 274 in engagement with the rack 264.

An upstanding supporting link 294 which is rotatably journalled on the shaft 276 acts as a support for one end of an adjustable, horizontally extending link 298 and for an arm 300. The shaft 276 also extends through a ratchet wheel 302 which is fixedly attached to the inner end of the collar 286. An outwardly extending rod 304 is attached to the face of the ratchet wheel 302 for manually rotating the ratchet wheel 302. The movable platform 246 is normally prevented from moving downward by a holding dog 306 which engages the ratchet wheel 302. The holding dog 306 is pivoted about a pin 308 which is attached to an L-shaped supporting bracket 310. As seen in Fig. 4, the supporting bracket 310 is attached by screws 312 to the bracket 280. The forward end of the holding dog 306 includes a pawl 312 which is adapted to engage the ratchet wheel 302 so as to permit the ratchet wheel 302 and the shaft 276 to rotate in one direction only. The pawl 312 of the holding dog 306 is normally biased towards the ratchet wheel 302 by a spring 314 which is attached to pins on the rearward end of the holding dog 306 and on the bracket 310. When it is desired to lower the movable platform 246, the holding dog 306 can be rotated so as to lift the pawl 312 out of engagement with the ratchet wheel 302. A pin 316 which extends outwardly from the forward face of the holding dog 306 provides a convenient means for manually rotating the holding dog 306.

Under certain conditions, i.e. when the wrapper foils fall a given distance below the top of the magazine housing 194, the ratchet wheel 302 is also engageable by a pawl 318 on the arm 300. The arm 300 is rotatably journalled on a pin 320 which extends through the supporting link 294 and one end of the adjustable link 298. The link 298 is constructed of two members 322 and 324 connected together by a nut and screw 326. A slot 328 is provided in the member 322 for adjusting the horizontal length of the link 298.

A collar member 328 containing three outwardly extending arms 330, 332, and 334 which are at right angles to each other is rotatably supported on a rod 336 which is attached to the main frame 100 by a nut and washer assembly 338 (see Fig. 6). The end of the arm 330 extends upwardly and is rotatably connected adjacent its end to the link 298 by a pin 340. The arm 332 extends downwardly and rotatably supports a cam roller 342 adjacent its end, which roller is adapted to engage a cam 344 on the shaft 140. The arm 334 extends horizontally below a rotatable shaft 346. A spring 348 on the shaft 346 biases the shaft against the arm 334 so as to retain the cam roller 342 in contact with the cam 344. In operation, the rotating cam 344 imparts an oscillating motion to the collar member 328, which motion is transmitted through the arm 330 to the link 298, thereby imparting a back-and-forth movement to the arm 330 and the pawl 318.

The pawl 318 on the arm 300 is held out of engagement with the ratchet wheel 302 by a hook 350 which engages and lifts the arm 300 unless the foil wrappers 192 fall a given distance below the top of the magazine housing 194. The hook 350 is integral with a rod 352 which is slidable in a bracket 354 connected to the forward face of the wrapper magazine housing 194 and said rod is connected at its upper end to a pin 356 on an arm 358. The arm 358 is pivoted at its outer end to a bracket 360 attached to the forward face of the magazine housing 194. A roller 362 is rotatably connected to the inner end of the arm 358 which extends over the surface of the foil wrappers 192 which lie within the magazine housing 194. As seen in Fig. 7, the roller 362 rests on the surface of the wrappers 192, thereby controlling the position of the arm 358 and the rod 352. As the wrappers 192 are removed from the magazine housing 194 the roller 362 moves downwardly causing the arm 358 and the hook 350 to descend, thereby lowering the reciprocating arm 300 which carries the pawl 318. Eventually, the pawl 318 will engage the teeth of the ratchet wheel 302 and will then rotate the ratchet wheel 302 clockwise one notch, thereby raising the platform 246 and the wrapers 192. As the wrappers 192 are raised the roller 362 will move upwardly, thereby causing the hook 350 to rise, and the arm 300 will therefore again move upwardly, moving the pawl 318 out of engagement with the ratchet wheel 302.

In order to assure that only one wrapper 192 is removed from the wrapper magazine 194 during each cycle of the transfer mechanism, a hold-down mechanism 364 is attached to the top of the wrapper magazine 194, as shown in Figs. 4, 12, 13, and 14. The hold-down mechanism 364 includes an L-shaped bracket 366 which is attached to the right side of the magazine housing 194 adjacent the forward and top edge thereof by screws 368. The bracket 366 extends forwardly and upwardly of the magazine housing 194, as seen in Fig. 13. An arm 370 is pivoted on the screw 372 threaded to the top of the bracket 366 and extends over the edge of the magazine housing 194. The arm 370 is separated from the bracket 366 by a bearing collar 372. A downwardly-inclined needle 374 is fixedly positioned within the inner end of the arm 370 by the set screw 376. The arm 370 is biased by a spring 378 which is attached at its upper end to a pin 380 on the arm 370, and at its lower end to a pin 382 on the bracket 366 so that the point of the needle 374 extends within the wrapper magazine housing 194. An adjustable stop 384 having a slot 386 is connected to the bracket 366 by a screw 388. The upper end of the stop 384 is bent so as to extend beneath the arm 370 to prevent the arm 370 from extending below a fixed point. The stop 384 is positioned so that the needle 374 contacts the surface of the uppermost foil wrapper 192 with a sufficient downward force so as permit the face of the uppermost wrapper 192 to be taken from the magazine housing 194, which will prevent the second wrapper from being removed from the magazine housing 194. To operate effectively, the point of the needle 374 must be sufficiently sharp so as to make a small slit in the uppermost wrapper when that sheet is removed from the magazine housing 194 but must not penetrate through the second wrapper.

To insert wrappers 192 within the magazine housing 194, one must first remove the side panel 244, rotate the arm 300 around the pin 320 until the back of the arm 300 rests on a pin support 390 on the link 298, and lift the holding dog 306 from the ratchet wheel 302. After the two pawls 312 and 318 are disengaged from the ratchet wheel 302, the weight of the platform 246 will generally cause the platform 246 to drop, or one can rotate the ratchet wheel 302 by means of the outwardly extending rod 304 so as to lower the platform 246 at a slower speed than generally results when it is allowed to fall under its own weight. When the holding dog 306 is released, it will again engage the ratchet wheel 302 so as to prevent a further downward movement of the movable platform 246. The wrappers 192 can then be inserted in the magazine housing 194 on the upper surface of the platform 246. After the wrappers 192 are placed in the magazine housing 194, the removable panel 244 is again placed in position in the side of the magazine housing 194, and the arm 300 is rotated back to its original position. As the wrappers 192 are below the top of the magazine housing 194, the removable platform can be manually raised by rotating the ratchet wheel 302 in a clockwise direction by the rod 304.

*Wrapper transfer mechanism*

The wrapper transfer mechanism, which is particularly illustrated in Figs. 1, 2, 4, 5, 6, 15, 16, and 22, is adapted to remove a single wrapper 192 from the wrapper magazine 194 and to position the wrapper 192 on the forming die 196. The transfer mechanism includes a transfer device 392 consisting of a U-shaped head section 394 and an extending arm section 396 and a means for moving the transfer arm between the wrapper foil magazine 194 and the forming die 196. The head section 394 is proportioned to extend within the boundaries of a wrapper 192 adjacent three sides thereof. One end of the arm section 396 is attached to the U-shaped head section 394 adjacent the end of one of the legs of the head section 394, and the other end of the arm section 396 is attached to the outer surface of an integral collar and arm 398. The head section 394 and the arm section 396 have intercommunicating passageways 400 which are adapted to be intermittently maintained under vacuum. These passageways are closed at the end of each leg of the head section 394 and at the end of the arm section 396 which joins the collar and arm member 398. A resilient suction cup 402 is connected to the bottom of each side leg of the head section 394 by means of an insert 404 which is molded to the suction cup 402 and threaded into the wall of the head section 394. The suction cup 402 and the insert 404 have a passageway 406 which communicates with the passageway 400 in the interior of the head section 394. A coupling 408, which communicates with a flexible conduit 410, is attached to the arm section 396 adjacent the collar and arm member 398 so as to interconnect the passageways 400 in the transfer arm 392 with the interior of the conduit 410.

The conduit 410 is connected to a cam-controlled valve (not shown) which connects the conduit 410 either to a source of vacuum or to the atmosphere. The operation of the valve is coordinated with the movement of the transfer arm 392 in a manner which will hereinafter be described.

The transfer arm 392 is operated from the main drive shaft 140 through a series of cams, links, and gears. In this connection, an appropriately-shaped cam 412 is attached to the rotating drive shaft 140 by a set screw 414. A rocker member 416 having a centrally-located collar 418 is pinned to a rotatable shaft 420. A cam roller 422 is journalled on one end of the rocker member 416 and rides on the upper surface of the cam 412. The opposite end of the rocker member 416 is attached to a spring 424 which biases the rocker arm 416 so as to keep the cam roller 422 in contact with the cam 412. A bevel gear 426 which is attached to the shaft 420 by a set screw 428 connects with a bevel gear 430 attached to the shaft 432 by a set screw 434. The shaft 432 extends through a vertical passageway in a bracket 436 which is attached to the packaging machine frame 100 by the bolts and nuts 438. Sleeves 440 extend within the passageway in the bracket 436 and provide a bearing surface for the rotating shaft 432. A collar 442 which is attached to the shaft 432 by a set screw 444 and the gear 430 position the shaft 432 within the bracket 436 so as to prevent the shaft 432 from moving in a vertical direction. A second collar and arm member 446 is connected to the upper end of the shaft 432 for transmitting movement from the shaft 432 to the transfer arm 392.

The rotatable shaft 346 is journalled within a bracket 448 attached to the packaging machine frame 100 by the bolts 450. Collars 452 and 454 limit the vertical movement of the shaft 346 within the bracket 448. The spring 348 on the shaft 346 extends between the collar 452 and the bracket 448 so as to bias the shaft 346 downward as aforesaid against the arm 334 of the collar member 328. The collar and arm member 398 is attached to the shaft 346, as by the set screw 456. The two collar and arm members 398 and 446 have universal joints or knuckles 458 attached thereto at their outer ends and are interconnected by a horizontal link member 460 which extends between the two knuckles 458.

In operation, the rotating drive shaft 140 imparts an oscillating motion to the shaft 420 through the movement of the rocker arm 416. The oscillating motion of the shaft 420 is transmitted to the shaft 432 through the bevel gears 426 and 430. The oscillating motion of the shaft 432 is imparted to the transfer arm 392 through the arm 446, the link 460, and the arm 398. In addition to its oscillating motion, the transfer arm 392 also has a slight vertical reciprocating motion. The vertical reciprocating motion of the shaft 346 is due to the reciprocating motion of the arm 334.

The coordination between the various operating members is accomplished through the controlling cams 412 and 344. The transfer arm 392, which is initially adjacent the upper surface of one of the wrappers 192 in the wrapper magazine 194, grips the wrapper 192 with the aid of its suction cups 402. At this point, the conduit 410 is connected to the source of vacuum. The transfer arm 392 is then caused to rise slightly in the vertical direction by the upward movement of the shaft 346. The transfer arm 392 is then caused to rotate so as to position the head section 394 intermediate the forming block 198 and the forming die 196. The transfer arm 392 is next lowered by the downward movement of the shaft 346 so that the foil wrapper 192 rests on the upper surface of the forming die 196. The cam-operated valve connected in the conduit 410 then operates so as to connect the conduit 410 to the atmosphere. The suction cups 402, which are now connected to atmospheric pressure, release their hold on the wrapper 192. The transfer arm 392 is then caused to rise and to return to its previous position above the magazine housing 194, at which position it is again lowered until the suction cups 402 are again in contact with the surface of a wrapper 192 within the wrapper magazine 194. The cam-operated valve within the conduit 410 then operates so as to connect the conduit 410 to the source of vacuum so as to allow the suction cups 402 to again grip the uppermost wrapper 192 within the wrapper magazine 194. The cycle is then repeated.

Forming mechanism

As has been pointed out, the forming mechanism transforms a flat sheet material such as foil into the form of an open-topped receptacle 200 having upstanding side walls and deposits said receptacle into a container 166. The forming mechanism includes the forming block 198 and the forming die 196 which includes a pair of forming shoes 204. The forming block 198, which is particularly shown in Figs. 1, 2, 4, 6, 17, 20, 21, and 22, is adapted to reciprocate through the forming die 196. The forming block 198 is in the shape of a rectangular parallelepiped and has four small, vertical passageways 462 extending therethrough which are adapted to transmit puffs of air to the lower surface of the forming block 198. A vertical rod 464 is welded at its lower end to a horizontally-positioned flange 466, which, in turn, is welded to the upper surface of the forming block 198. The rod 464 and the flange 466 include the interconnecting passageways 468 and 470, which, in turn, communicate with the passageways 462 in the forming block 198. A horizontally disposed rod 472 which includes a passageway 474 extends through the upper end of the vertical rod 464. The rod 472 has an opening in its wall which interconnects the horizontal passageway 474 of the rod 472 with the vertical passageway 468 in the rod 464. The rod 472 extends transversely of the packaging machine and is connected at its outer end to a collar 476. A coupling 478 in the collar 476 interconnects a conduit 480 to the passageway 474 in the rod 472. The conduit 480 is connected to a cam-controlled valve (not shown) which is adapted to connect intermittently the conduit 480 to a source of pressure air.

The collar 476 is connected to a vertically extending, solid, reciprocable rod 482 which passes through a vertical sleeve 484 on a bracket 486. The bracket 486 is connected to the packaging machine frame 100, as shown in Fig. 20. The reciprocable rod 482 is prevented from rotating within the sleeve 484 by a pin 488 which is attached to the rod 482 and which slides in a vertical slot 490 through the sleeve 484. The lower end of the rod 482 is bifurcated to admit one end of a link 492. The link 492 is journalled within the bifurcated arms 494 on a pin 496. The pin 496 extends through the bifurcated arm 494 and is threaded to receive a nut 498. The opposite end of the link is connected to an arm 500 of a rocker member 502 by a pin 504 which is threaded at its outer end to receive a nut 506. The rocker member 502 is positioned by a set screw 503 on a pivot shaft 508 which extends between and is rotatably journalled on the machine frame 100 and an auxiliary plate member 510 which is suitably attached to the frame, as shown in Fig. 6. The shaft 508 is prevented from moving transversely by the collars 512 and 514 which are positioned on the shaft 508 by the set screws 516 and 518. The rocker member 502 includes an outwardly extending arm 520 having a roller 522 affixed thereto adjacent its outer end by a bolt and nut 524. The roller rotates on the bottom of a cam 526 which is fixedly secured to the drive shaft 140 by a set screw 528. The roller 522 is biased against the rotating cam 526 by a spring 530 which is positioned around the reciprocable rod 482 between the lower end of the sleeve 484 and a collar 532 which is positioned on the rod 482 above the bifurcated arms 494.

In operation, the rotation of the cam 526 on the drive shaft 140 causes the rocker member 502 and the pivot shaft 508 to oscillate. The resulting oscillation of the arm 500 transmits a reciprocating vertical motion to the rod 482 and the forming block 198 through the link 492. The drive means for the forming mechanism is designed so as to cause the forming block 198 to reciprocate in timed sequence with the other operating mechanisms of the packaging machine.

As previously set forth, the forming block 198 is adapted to reciprocate through a forming die 196 which includes a pair of forming shoes 204. The forming die 196 is particularly shown in Figs. 1, 4, 17, 18, and 49. As seen in the drawings, the forming die 196 is supported on an auxiliary frame 534 which extends above and which is connected to the packaging machine frame 100. The frame 534 includes the vertical, angle-shaped legs 536 and a top-plate 538 which has a downwardly depending skirt 540 along its outer periphery. The bases of the legs 536 are attached to the packaging machine frame 100 by vertical bolts 542 which extend through the horizontally extending flanges 544 of the legs 536 and into the upper plate 106 of the machine frame 100. Angle members 546 which are welded to the tops of the legs 536 are connected to the under surface of the top-plate 538 by welding or the like. The top-plate 538 is appropriately cut away at 548 to admit the forming die 196 and the forming block 198.

The forming die 196 includes two similar, cooperating, vertically extending, horizontally U-shaped members 550 which are diametrically located with respect to one another so as to assume the form of a vertically extending, rectangular tube. The members 550 are adjustably secured together by a bracket 552 which extends between the side leg or flange sections of the members 550 adjacent their lower edges by the bolts 554. Each bracket 552 includes a longitudinally extending slot 556 for adjusting the spacing between the members 550.

Each member 550 is attached to a fabricated bracket 558 having side wings 560 and a horizontal upper plate 562. Each of the upper plates 562 includes the slots 564 for adjustably fastening the members 550 in position on the auxiliary frame 534. The bottom surface of the top-plate 538 of the auxiliary frame 534 includes appropriately-positioned, welded bosses 566. The top-plate 538 and the welded bosses 566 include countersunk holes for receiving the screws 568. As shown in Fig. 17, the screws 568 extend through the plate 538, the slots 564, through washers 570, and into nuts 572. During the assembly of the forming members 550, the forming block 198 may be lowered and the members 550 positioned around the forming block 198. After the screws 568 are placed in position, the nuts 572 can be tightened.

Each flange section of the forming members 550 is cut away along an arc extending from the upper outer corner of the flange section to a point adjacent the bottom of the forward or inner edge of the flange section. The inside faces of the flanges of the forming members 550 are appropriately curved along their edges, as illustrated, so as to be able to smoothly fold the wrappers when they are forced through the forming members 550 by the forming block 198. The lower portion of the base or web section of the members 550 are cut away as shown in Fig. 6 to permit the upstanding side walls on the formed open receptacle 200 to move from the forming die 196 without being bent by said web sections.

The forming shoes 204 of the forming die 196 are horizontally positioned along the flange sections of the forming members 550. The forming shoes 204 are rigidly attached to the members 550, as by the screws 206. As previously set forth, the forming shoes include a central, horn-shaped section 208 and the arcuate wing sections 214 located adjacent either side of the horn-shaped section 208. The horn-shaped section 208 has a flat, vertical base portion 210 and an upwardly extending portion 212 which curves outwardly from the base portion 210.

The forming die 196 is proportioned so that the forming block 198 can slide therethrough along with a wrapper 192 so as to fold the foil wrapper 192 into an open-topped receptacle 200. The exact manner in which the foil wrapper 192 is transformed during its passage through the forming die 196 has been described in the discussion of the action of the various operating stations and will not be repeated at this point. When assembled, the bottom of the forming die 196 is positioned at a slight distance above the top of the containers 166 which ride on the conveyor 116.

After the wrapper 192 is transformed into an open-topped receptacle 200 and placed in the container 166, air is delivered through the holes 462 to strip the receptacle from the forming block while the latter is elevated to its original position above the forming die 196. The conveyor 116 then moves the container 166 with its receptacle 200 from the wrapper transfer and receptacle forming station A. The container 166 continues along the conveyor 116 during successive movements of the Geneva drive 136 until the container 166 is positioned beneath the filling mechanism at the filling station B.

*Filling mechanism*

The filling mechanism is particularly shown in Figs. 1, 2, 23, and 24. The filling mechanism is supported on a sub-frame 574, and diagonal cross members 576 extend between the filling mechanism and the sub-frame 574 to provide additional support therefor. The sub-frame 574 is positioned adjacent the far side of the frame 100, as seen in Fig. 2, and is appropriately attached to the frame 100 in a conventional manner (not shown). The filling mechanism includes a hopper 578 for storing a supply of heated cream cheese 220 to be packaged, a valve member 579 for releasing the cheese 220 from the hopper 578, and a retractable spigot 580 which is adapted to be lowered into a position which is above the surface of the container 166 when the container 166 is positioned at the filling station B. The general features of the filling mechanism, including the hopper 578 and the crank-operated valve means 579, may be similar to the filling unit disclosed in the patent to Bagby, No. 2,099,253, issued November 16, 1937, and will not be described in this application. In order to fill the open receptacles 200 without splattering the cheese 220, the retractable spigot 580 is lowered to a position adjacent the upper surface of the container 166 before the valve means 579 allows the cheese 220 to be emitted from the filling mechanism. After the container is filled with the proper amount of cheese 220, the valve means 579 operates to stop the flow of the cheese 220, and the spigot 580 is retracted to its original position, as shown in Fig. 24. As has been previously set forth, the open receptacles 200 are filled with cheese 220 substantially level of the walls of the container 166. After the spigot 580 is retracted, the conveyor can move the containers 166 along the conveyor 116 without having the upstanding flaps of the open receptacle 200 strike the spigot 580.

The spigot 580, which is attached to a conduit 582 which extends from the valve means 579 to a ball and socket joint 584, has a cam-controlled linkage means 585 for moving the spigot 580 between its lower and upper positions. The linkage means 585 includes a short link 586 which is pivoted at one end to the forward end of the spigot 580 and at the other end to one arm of a bell crank or right-angled link 588. The right-angled link 588 is pivoted at its apex to the exterior of the valve means 579 and is pivoted adjacent the end of the second arm to an extending link 590. The extending link 590 is pivoted at its far end to a pin 592 which is movable within a slot 594 in a pivoted member 596. The pivoted member 596 is fixedly connected at its end to a pin 598 which extends through a bracket 600 welded to the housing which encloses the valve means 579. A link or arm 602 having a cam roller 604 rotatably attached to its outer end is fixedly connected to the pin 598 adjacent its inner end. A cam 606 rotates about a shaft 608 which drives the valve means 579. The cam 606 controls the motion of the cam roller 604, and through the linkage system 586, 588, 590, 596, and 602 also controls the movement of the spigot 580. A spring 610 is attached between the right-angled link 588 and a shoulder 612 on the filling mechanism for biasing the cam roller 604 against the rotating cam 606.

Both the valve means 579 and the cam-operated spigot 580 are operated by a belt and pulley means 614 which is connected through ordinary means to the main drive shaft 140. The various operating means are cooperatively inter-related so that the filling mechanism operates in the following manner. During the movement of the conveyor 116, the spigot 580 remains in its uppermost position shown in Fig. 24. When the conveyor motion ceases, a container 166 is appropriately positioned at the filling station. While the container 166 remains in position at the filling station, the cam 606 rotates so as to cause the spigot 580 to move to its lowermost position, as shown in Fig. 23. When the spigot 580 is at its lowermost position, the valve means 579 operates so as to allow only a predetermined amount of cheese 220 to enter the open receptacle 200. After the flow of the cheese 220 stops, the cam causes the spigot 580 to rise back to its uppermost position, at which point the conveyor 116 is again set in motion.

If desired, a photoelectric mechanism 616 may be incorporated into the system so as to prevent the downward flow of the cheese 220 whenever a container 166, which is at the filling station, does not include an open receptacle 200. This is accomplished by a light source 618 which is appropriately positioned so as to direct a light beam transverse to the path of the conveyor 116 and is positioned such that it will intercept the upwardly extending flaps of the open receptacle 200 when the package is properly positioned at the filling station within the container 166. The light emitted from the light source 618 impinges on a photoelectric detector 620 whenever the container 166 does not contain an open-topped receptacle 200. The photoelectric detector 620 may be connected in an ordinary manner to a safety device within the valve means 579 so as to prevent the cheese 220 from being emitted by the filling mechanism whenever the detector 620 is actuated.

After the open-topped receptacles 200 which are within the containers 116 are filled with cheese 220 at the filling station, they are moved along the conveyor until they reach the insert station C.

*Insert transfer mechanism*

At the insert station C, an insert mechanism removes a rectangular sheet of flat, relatively stiff sheet material, or insert, 222 from a magazine 224 and positions the insert 222 on the surface of the cheese 220 within the boundaries of the upstanding flaps of the receptacle 200. Before releasing the insert 222 on the surface of the cheese 220 within the open receptacle 200, the insert mechanism presses the insert 222 against the surface of the cheese 220 to level the surface of the cheese 220 in preparation for the subsequent packaging operations. The insert mechanism is particularly shown in Figs. 1a, 2a, 25, 26, 27, 28, 29, 30, 31, and 32. In packaging cream cheese, the insert preferably comprises a rectangular paper sheet which is impregnated with wax and which has the same surface dimensions as the inner dimensions of the open-topped receptacle 200. Preferably, the wax paper insert 222 should be between 5 and 10 mils in thickness, which is sufficient to provide a firm surface over which the upstanding flaps of the open receptacle 200 can be folded. In addition, the insert 222 should be impregnated with a wax which does not become tacky at temperatures below 170° F. so as to prevent the wax from running into the cream cheese 220. However, it should be understood that any other relatively rigid, non-reactive sheet-like material could also be used as an insert.

The insert mechanism is supported on an auxiliary frame 624 and is attached to the main frame by bolts 626, or by welding. A vertically extending bracket 628 which is bolted to the auxiliary frame 624 supports the magazine 224 which is adapted to retain a vertical stack of inserts 222. The insert magazine 224 is fabricated from two vertically extending channel members 630 which are connected to the supporting members 632 by the screws 634. The supporting members 632 are connected to the vertical bracket 628 by the bolts 636 and the nuts 638. The channel members 630 are proportioned so that the wax paper inserts 222 engage the flanges and webs of the channel members 630 so as to be vertically slidable within the magazine 224. Retaining pins 640 are threaded into each of the flange sections of the channel members 630 adjacent the lower end of the insert magazine 224 for retaining the inserts 222 within the insert magazine 224. The retaining pins 640 are maintained in a fixed position within the channel members 630 by the lock nuts 642. The wax paper inserts 222 can be manually placed within the wax paper insert magazine 224 by lowering the inserts 222 into the guideways formed by the open-topped channel members 630 of the insert magazine 224.

The insert mechanism includes the rotatable transfer unit 644 comprised of a cylindrically-shaped, rotatable body section 226 and a pair of arm members 228 which are adapted to reciprocate within the body section 226. A shaft 650 extends transversely through the center of the body section 226 and is keyed thereto, as shown in Fig. 29. The shaft 650 is rotatably mounted in the bearings 652 which are connected to the auxiliary frame 624 by the bolts 654. The reciprocable arm members 228 are diametrically located with respect to the body section 226. Since the members 228 are similar in construction and operation, the following description will be applicable to both of the members 228. The arm member 228 includes a flat, rectangular-shaped head section 656 and a shaft 658 which extends downwardly from, and which is integral with the head section. The shaft 658 includes a portion of greater diameter 660 adjacent its lower end which is adapted to slide within a radial passageway 662 in the rotatable body section 226. A packing gland 664 in the mouth of the radial passageway 662 provides an airtight closure between the atmosphere and the interior of the radial passageway 662. The packing gland 664 includes an insert 666 having a threaded bore 668, said insert 666 being fixedly secured to the rotatable body section 226 at the outer end of the passageway 662 by the set screw 670. Packing material 672 fits within the insert 666, and a collar member 674 slides on the shaft 658 and threades into the insert 666. The rectangular head section 656 includes a network of passageways 676 which extend from holes in the outer end of the rectangular head section 656 to the center of the head section 656. The passageways 676 interconnect with a passageway 677 extending through the center of the shaft 658 to a point adjacent the portion of greater diameter 660 and the passageway 677 then extends at a right angle to the surface of the shaft 658. An additional passageway 678 extends vertically through the enlarged portion 660 of the shaft 658.

A link means which is exterior to the body section 226 connects the two arm members 228 together so that they reciprocate in unison with each other. The link means includes a pivot link 680 which is journalled on the shaft 650. Each end of the pivot link 680 is connected to one end of one of a pair of similarly-proportioned links 682. The opposite ends of the links 682 are rotatably connected by outwardly extending pins 684 to the members 686. The members 686 are fixedly attached to the base of the rectangular head sections 656 by welding, or the like, and extend radially towards the shaft 650.

A cylindrical member 688, preferably fabricated from nylon plastic, is centrally journalled on the shaft 650 and has its inner face bearing against one of the outer faces of the cylindrically-shaped body section 226. The nylon cylinder 688 includes the circular grooves 690 and 692 along its inner face which connect with passageways 694 and 696 leading from the grooves 690 and 692 to the outer surface of the member 688. A cylindrical metal plate 698 which has the same diameter as the member 688 is also centrally journalled on the shaft 650 and is attached to the outer face of the member 688 by the countersunk screws 700. The member 688 is biased against the rotatable body section 646 by a spring 702 which extends around the shaft 650 from a boss 704 on the metal plate 698 to the adjacent bearing member 652. Rods 706 are attached to the outer face of the metal plate 698 adjacent its lower end by means of welding, or the like, and slidably extend through horizontally-disposed bearing members 708 in the auxiliary frame 624. The bearing members 708 are retained in position in the frame 624 by the nuts 710. The slidable rods 706 allow the plate 698 and the nylon member 688 to move horizontally so as to press against the side of the body section 226, but prevent the plate 698 and the member 688 from rotating with the body section 226. Passageways 712 and 714 extend through the metal cylinder and interconnect with the passageways 694 and 696 in the nylon cylinder. Connectors 716 and 718 are threaded into the outer end of the passageways 712 and 714 so as to connect the passageways with the conduits 720 and 722. Cam-controlled valves 724 and 726 (shown diagrammatically in Fig. 27) connect the conduits 720 and 722 either to a source of vacuum or to the atmosphere. The circular groove 690 in the member 688 connects with one of the passageways 662 in the body section 226 through an opening 728 in the wall of the body section 226, and the other circular groove 692 in the member 688 connects with the other passageway 662 in the body section 222 through an opening 730 in the wall of the body section 226.

A collar and flange member 732 is journalled on the shaft 650 and is rigidly connected to the body section 226 on the side opposite the member 688 by the screws 734. The outer face of the collar member 732 bears against the inner face of the pivot link 680. A collar 736 having an inwardly extending sleeve section 738 which bears against the outer face of the pivot link 680 is connected to the shaft 650 by means of a set screw 740. A torsion spring 742 extends around the shaft 650 and the sleeve section 738 and is pinned to the collar 736 and to the pivot link 680. A sprocket 744 which is adapted to be driven by a chain 746 is connected to the shaft 650 by a set screw 748.

The extension of the arm members 228 is controlled by a cam 750 which is connected to the shaft 146 and rotates therewith. A cam roller 752 is rotatably connected to the lower end of a vertically-reciprocable member 754. The lower portion of the member 754 consists of an oval-shaped by-pass 756 which allows the vertically-reciprocable member to reciprocate without interfering with the shaft 146. The upper portion of the member 754 consists of a rod portion 758 which passes through the bearings 760 in the brackets 762 which are connected to the auxiliary frame 624. A collar 764 having a vertical keyway 766 adjacent its outer surface is connected on the rod portion 758 by a set screw 768. A vertical key 770 on the bracket 772 which is attached to the auxiliary frame 624 by the screws 774 is adapted to interfit with the keyway 766 in the collar 764 so as to prevent the reciprocable member 754 from rotating about its vertical axis. A spring 776 located on the rod portion 758 extends between the collar 764 and the lowermost bearing member 760 for biasing the cam roller 752 against the cam 750. The upper end of the rod portion 758 is connected to a horizontally extending member 778. A member 780 which is connected to the outer end of the member 778 by a screw 781 is adapted to engage the upper surface of the outwardly extending pin 684 on the members 686.

A drive mechanism for rotating the transfer unit 644 is shown in Fig. 1a. The shaft 130 drives a sprocket 782 which rotates a drive chain 784. The drive chain 784 rotates a sprocket 786 on the shaft 788, and the shaft 788, in turn, rotates a sprocket 790. The sprocket 790 drives the drive chain 746 which rotates the sprocket 744 on the shaft 650 and the transfer unit 644. The chains 784 and 746 also extend around idler sprockets 794 and 796. Thus, whenever the shaft 130 rotates, the conveyor 116 moves the containers 166 to successive positions on the packaging machine and simultaneously, rotates the transfer unit 644 by 180°.

The insert transfer mechanism operates in the following manner. When the reciprocable arm members 228 are in their retracted position, as shown in Fig. 27, the conveyor 116 transfers the containers 166 between successive stations, and the transfer unit 644 is rotated 180°. During this time, the conduit leading to the passageways 676 and 677 in the arm member 228, which at the start of the rotation was adjacent the top of the body section 226, is connected through the cam-operated valve to the source of vacuum, and the conduit leading to the passageways 676 and 677 in the interior of the opposite arm member 228, which at the start of the rotation was adjacent the bottom of the body section 226, is connected through its cam-operated valve to the atmosphere. After the conveyor 116 has appropriately positioned a container 166 at the transfer station and the transfer unit 644 has stopped its rotation, the cam 750 actuates the cam roller 752, causing the member 780 to bear downward on the outwardly extending pin 684. This causes the reciprocable arm members 228 to move outward against the force of the torsion spring 742 on the shaft 650. The two arm members 228 continue to move outwardly until the head section 656 of one of the arm members 228 presses an insert 222 against the upper surface of the cheese 220 in the open-topped receptacle 200 to level the surface of the cheese 220 within the open receptacle 166, and the other rectangular head section 656 of the other arm member 228 is adjacent the lower surface of the bottommost wax paper insert 222 in the insert magazine 224.

The cam-operated valve which connects the conduit which leads to the interior of the reciprocable member 228 which extends over the surface of the cream cheese 220 now operates so as to connect that conduit to the atmosphere. The insert 222 which had been adhering to the surface of the rectangular head section 656 is now released so as to remain on the surface of the cream cheese 220. Simultaneously, the valve leading to the opposite conduit turns so as to connect that conduit to the source of vacuum. The head section 656 of the reciprocable arm member 228 which is positioned against the lower surface of the bottommost insert 222 within the magazine 224 is now connected to the source of vacuum, and therefore, is able to grip the insert 222.

The rotating cam 750 then causes the cam roller 752 to move upward, thereby releasing the downward force on the pin 684. The force of the torsion spring 742 is sufficient to force the pin 684 against the member 780 as the member 780 moves upwardly, thereby retracting the reciprocable members 228. The suction between the rectangular head section 656 of the upwardly extending arm member 228 and the wax paper insert 222 is sufficient to permit the insert 222 to be withdrawn from the magazine 224 against the force of the retaining pins 640. Thus, when the reciprocable members 228 are retracted, the upper reciprocable member 228 includes an insert 222 on the surface of its rectangular head section 656, whereas the lower reciprocable member 228 does not include an insert 222 on the surface of its head section 656.

At this point in the operation of the packaging machine, the Geneva drive 136 again causes the conveyor 116 to operate moving the containers 166 to their next succeeding position. During this movement, the rotatable transfer unit 644 is again rotated 180°, thereby positioning the reciprocable member 228 which holds the insert 222 on the lower side of the transfer unit 644.

At this point, the container 166, which had been at the preceding position, is now properly stationed at the insert station C. The rotating cam 750 once again operates to extend the reciprocable members 228. When the members are in their fully-extended position, the valves are once again actuated so as to deposit the insert 222 on the surface of the cheese 220 and to withdraw the lowermost insert 222 from the magazine 224. The above operations are repeated during the continued operation of the packaging machine.

After the containers 166 leave the wax paper insert station, they continue their movement along the conveyor 116 until they eventually reach the folding station D.

*Wrapper folding mechanism*

When a container 166 arrives at the folding station, it contains a cheese-filled, open-topped foil wrapper receptacle 200. In addition, an insert 222 is seated within the open receptacle 200 on the surface of the cheese 220. As has been set forth, the side walls of the open receptacle 200 include upwardly extending sections which constitute top flaps. At the folding station, a folding mechanism operates on the upwardly extending flaps of the open receptacle 200 so as to fold the flaps over the insert 222, thereby forming a closed cheese package. The folding mechanism is particularly shown in Figs. 1a, 2a, 34, 35, 36, 37, and 38.

The folding mechanism includes the folding members 230 which are adapted to reciprocate transversely of the conveyor so as to fold the transversely extending flaps of the cheese-filled wrapper receptacle 200 over the insert 222. The folding members 230 are comprised of flat plate sections 798 which are adapted to slide on horizontal blocks 800 within the guideways 802 and inwardly extending, triangular-headed folding blades 804 which are of the same width as the wax paper insert 222. The folding blades 804 are attached to the plate sections 798 by the screws 806. Each plate section 798 includes an upstanding, cylindrical boss 808 which is welded to the upper surface of the plate section 798. The guideways 802 are formed by the transversely extending guide members 810 which are attached to the blocks 800 by the screws 812. The blocks 800 are attached to flanges 814 on brackets 816 by means of bolts 818. The brackets 816 which are bolted to the side of the packaging machine frame 100 by bolts 819 include vertically extending sleeves 820 which support bearings 822 for rotatably journalling the shafts 824.

Each of the plate sections 798 which reciprocate within a guideway 802 is controlled by a rotating cam 826 which is appropriately positioned on the upper end of one of the rotatable shafts 824 by the set screw 827. The shaft 824 extends through the bearing 822 in the vertical sleeve 820 and has a bevel gear 828 connected thereto at its lower end. A spring 830 which extends between the upper end of the shaft 824 and an upstanding rod 832 which is integral with, and extends upward from the boss 808, biases the said boss 808 against the rotating cam 826. The bevel gear 828 meshes with a cooperating bevel gear 834 on a horizontal shaft 836 which is journalled in bearings 838 on the machine frame 100. The shaft 836 is connected at its outer end to a gear 840 by set screws 841. The gear 840 meshes with a worm gear 842 which is keyed to the drive shaft 146. The turning of the drive shaft 146, through the gears 840 and 842, causes the shaft 836 to rotate. The rotation of the shaft 836, in turn, through the bevel gears 828 and 834, causes the two shafts 824 and their associated cams 826 to rotate. The rotation of the cams 826, in turn, causes the folding members 230 to reciprocate so as to move inwardly over the surface of the containers 166.

The oscillating folding arm 232 operated by a cam and roller mechanism is adapted to fold one of the longitudinally extending flaps of the open receptacle 200. The folding arm 232 is adapted to oscillate about the axis of a shaft 844 so as to fold the rearward upstanding, longitudinally extending flap of the open receptacle 200. The arm consists of an L-shaped, rectangular, metal plate 846 which is substantially of the same width as the longitudinally extending flap of the open receptacle 200. The folding arm is connected to the rotating shaft 844 through the L-shaped fingers 848, which fingers are integrally attached to a sleeve 850 which is affixed to the shaft 844 by a set screw 852. Screws 854 extend through the fingers 848 into the upper portion of the metal plate 846. The shaft 844 is rotatably journalled in a bearing 856 on a bracket 858 which is connected to the main frame by the bolts 860. A gear 862 which is pinned to the shaft 844 meshes with a gear 864 pinned to a shaft 866 journalled in a second bearing 868 on the bracket 858.

An arm 870 is connected for oscillating movement with the shaft 866. The arm 870 is rotatably connected to a cross-link 872 by a pin 874. The opposite end of the cross-link 872 is rotatably connected by a pin 873 to a horizontally extending member 874 which is attached to a vertically extending, threaded stub 876. A coupling 878 having a threaded bore in each of its ends, one bore of which is adapted to interconnect with a member having a right-handed thread and the opposite bore of which is adapted to interconnect with a member having a left-handed thread, connects the stub 876 with a vertically extending rod 880. Thus, by turning the coupling or connector 878 in one direction, the total length of the stub, coupling, and rod can be extended, and by turning the coupling in the opposite direction, the total length of the assembly can be contracted. The rod 880 extends through and is rotatably journalled in bearing sleeves 882 which are connected within a bracket 884 which is attached to the side of the machine frame 100 by bolts 886. The rod 880 is integrally connected at its lower end with a bifurcated yoke 888. A cam roller 890 is supported within the bifurcated yoke 888 on a pin 891 which is supported within the arms of the yoke 888. The cam roller 890 rides on a cam 892 connected to the main shaft 146. The cam roller 890 is biased towards the cam 892 by a spring 894 which is mounted on the rod 880 between the lower bearing sleeve 882 and the upper end of the yoke 888.

The rotating motion of the cam 892 produces a vertical, reciprocating motion of the rod 880 and the stub 876. This motion is transmitted by the link 872 and arm 870 into an oscillating motion of the shaft 866, which oscillating motion is imparted to the folding arm 232 through the gears 862 and 864 and the shaft 844.

The cams 826 and 892 associated with the folding station are designed so as to operate the folding mechanism in the following time sequence. After the conveyor 116 places a container 166 at the folding station, the triangular-shaped folding blades 804 move inward towards the center of the conveyor 116. The moving blades 804 cause the transversely extending flaps of the open receptacle 200 to be folded to a horizontal position overlying the insert 222. During this period, the folding arm 232 remains in an upwardly extending position out of contact with either the container 166 or the flaps of the open receptacle 200. The rotating cams 826 then cause the folding blades 804 to recede and the cam 892 causes the folding arm 232 to descend so as to engage and fold the rearward longitudinal flap of the aluminum foil open receptacle 200 to the plane of the upper surface of the container 166.

The remaining upstanding flap of the open receptacle 200 is folded to a horizontal position overlying the previously-folded flaps by a stationary arm 234. Bolts 895 extend through slots 897 in the stationary arm 234 for adjustably connecting the stationary arm 234 to the packaging machine frame 100. The stationary arm 234 includes a transversely extending crosspiece 896 having a triangular-shaped, central portion 898 which faces towards the forward end of the conveyor 116 and which is inclined slightly upwardly towards the apex of the triangle. The stationary arm 234 is positioned so that the transversely extending crosspiece 896 comes into sliding contact with the upper surface of the containers 166 as they move along the conveyor 116 on the packaging machine. The forward face of the triangular portion 898 is adjacent the outer face of the forward transverse flap of the open receptacle 200 when the container 166 is located at the folding station.

As soon as the folding arm 232 completes its downward movement so as to fold the rearward transverse flap of the open receptacle 200, the conveyor mechanism is operated by the Geneva drive 136 so as to move the containers 166 forwardly on the conveyor 116. The container 166 then moves under the stationary arm 234 which operates so as to fold the last-remaining, upstanding flap of the open receptacle 200 horizontally over the previously-folded flaps. Simultaneously with this movement, the folding arm 232 is moved back to its uppermost position so as not to interfere with the upstanding flaps of the open receptacle 200 within the container 166, which is moving to the folding station. During this period, the folding blades 804 are in their rearmost position so they do not come into contact with the upstanding transverse flaps of the open receptacle 200 in the container 166, which is moving to the folding station.

When the containers 166 leave the folding station D, they contain a wrapped cheese package having dimensions which are the same as the inner dimensions of the container 166. The wrapped cheese package is thus in the form of a rectangular block and includes the loosely-folded flaps on its upper surface. After leaving the folding station, the containers 166, which now contain the wrapped cheese packages, continue their movement along the conveyor to the sealing station E.

*Sealing mechanism*

At the sealing station E, a sealing mechanism operates so as to adhesively secure together portions of the overlapping wrapper flaps which are supported in planar condition on the upper surface of the flowable cheese by the insert 222. The sealing of the overlapping flaps is necessary to prevent foreign organisms or materials from entering the cheese package and also to prevent the package from coming apart during the ordinary handling of the cheese package during shipment. The sealing mechanism is particularly illustrated in Figs. 1a, 2a, 39, 40, and 41.

The sealing mechanism includes a heated sealing unit 236 which is adapted to reciprocate in a vertical direction. The sealing unit 236 is comprised of a rectangular, metal base plate 900, a rectangular body section 902, and a top-plate 904. The base plate 900 is of the same size as the upper surface of the wrapped cheese package and is attached to the body section 902 by countersunk screws 906. The base plate includes a recess or cut-out 907 for a purpose which will hereinafter be set forth. The body section 902 is constructed out of a heat conducting material and includes two recesses 908 and 910 which house an ordinary type heating element 238 and a standard control element 240. The heating element 238 can be connected to a source of electrical energy through the wires 912, and the control element which can be actuated by the temperature of the body section may be interconnected with a suitable switch in the heating circuit through the wires 914. The body section 902 may also include some form of insulation adjacent its upper surface so as not to overheat the top-plate 904. The upper plate 904 which is attached to the body section 902 by the bolts 916 has a vertical collar 918 integrally attached to its upper surface by welding, or the like. A vertically extending rod 920 is set within and connected thereto by a set screw 922.

The sealing unit 236 is adapted to be reciprocated in a vertical direction by means of a cam follower and a link means. A cam roller 924 is journalled in a pin 925 which is fixedly attached to the base portion 926 of a vertically extending rod 928. The cam roller 924 rides on the upper surface of a cam 930 which is fixedly attached to the shaft 146. The vertically extending rod 928 is slidably mounted in bearing sleeves 931 located within the arms of a bracket 932 which is connected to the main frame by the bolts 934. A flanged collar 936 is fixedly attached to the rod 928 adjacent the cam roller 924 by a set screw 938. A spring 940 is located on the rod 928 between the flanged portion of the collar 936 and the lower arm of the bracket 932 for biasing the cam roller 924 against the rotating cam 930. A collar 942 having a keyway therein is pinned to the rod between the bearing sleeves 931 and a vertically extending key 944 which fits within the keyway of the collar 942 is connected to the bracket 932 by the bolts 946. The keyway prevents the rod 928 from rotating around its vertical axis. The rod 928 is connected to the rod 920 by a link or arm 948 which extends between the upper end of the rod 928 and the upper end of the rod 920. The rods 928 and 920 are secured to the link 948 by the nuts 950 and 952.

The sealing mechanism is proportioned so as to locate the base plate 900 directly over the upper surface of the wrapped cheese package when the wrapped cheese package is in position at the sealing station E. As the cam 930 rotates, it causes the sealing unit 236 to reciprocate in a vertical direction through the rods 920 and 928 and the link 948.

When the conveyor 116 moves the containers 166 between successive positions, the sealing unit 236 is positioned above the top of the containers 166. During the period in which a container 166 remains at the sealing station, the rotating cam 930 causes the sealing unit 236 to lower until the base plate 900 rests on the upper surface of the wrapped cheese package thereby pressing the flaps into engagement with one another and, at the same time, heating the wax in the wrapper. The heating element 238 within the sealing unit 236 keeps the base plate at a temperature of about 170° F., which is sufficient to make the wax within the aluminum foil wrapper 192 become tacky. As has been previously stated, the base plate 900 includes a recess or cut-out 907 which is located on the lower surface of the base plate 900 at a position which overlies the apex of the topmost flap of the wrapped cheese package. The heated base plate 900 causes the flaps on the upper surface of the wrapped cheese package to be bonded to the next succeeding wrapper layer except for the portion beneath the cut-out of the base plate 900. The rotating cam then causes the sealing unit to move upward. After the sealing unit leaves the surface of the wrapped cheese package, the Geneva drive 136 again moves the containers 166 along the conveyor 116. The apex of the uppermost flap, which was not acted upon at the sealing station, provides a convenient tab by which the cheese package may later be unwrapped. It should be noted that the heat which has been applied by the sealing unit 236 is sufficiently hot to make the wax within the wrapper tacky, but is not hot enough to cause the wax to melt and run into the cheese within the interior of the package.

After the cream cheese package is sealed by the sealing station, the container 166 continues to move along the conveyor 116. As the container 166 approaches the end of the upper run of the conveyor 116, a curved holding guide 954 attached to a cross member 956 which extends between the sides of the machine frame 100 provides an upper cover for the container 166 and insures that the sealed cream cheese package 241 does not fall out of the container 166 when the container turns around the sprocket 124. The holding guide 954 extends to a point adjacent the bottom of the sprocket 124. When the conveyor 116 moves the container 166 beyond the end of the holding guide 954, the sealed cheese package 241 is able to drop out of the container 166 and onto a suitably driven conveyor belt 242 which revolves about a pulley 960 on a shaft 962. The moving conveyor belt 242 carries the sealed cheese package 241 from the packaging machine. The holes 188 and 190 which extend through the container 166 and the conveyor plate 118 eliminate any suction which might otherwise occur between the base of the container 166 and the bottom of the sealed cheese package 241 when the sealed cheese package 241 slides out of the container 166 onto the convyor belt 958. The empty container 166 then moves along the lower run of the conveyor 116, passes around the sprocket 126, and continues on to the forming station where it again receives another open-topped receptacle 200 preformed from an aluminum foil wrapper 192 as described, and the entire process is then repeated.

In the foregoing, there has been described a method of packaging viscous material in a flexible wrapper such as aluminum foil which results in a sealed, leak-proof package having a definite outer contour, and a packaging machine which is particularly adapted to carry out the method. The desired results are obtained, in part, by placing the flexible wrapper after it is formed into an open receptacle into a mold, or container, and in part, through the novel provision of a rigid insert which is positioned on the viscous material within the open receptacle prior to folding the upwardly extending side walls of the receptacle so as to form a closed package. The insert provides rigid edges over which the upwardly extending side walls may be folded and sealed. The finished product, which has a pleasing, well-defined shape and leak-proof construction, includes an unsealed tab, or ear, on its upper surface which provides a convenient means by which the sealed side walls may be pulled apart. The described packaging machine includes a series of operating stations embodying novel constructional features which provide a simple, compact, and efficient means for carrying out the described packaging method. Further, the packaging machine has an open construction and includes a conveyor having removable molds, or containers. Both of these features permit the packaging machine to be quickly repaired and cleaned.

The described structure may be varied considerably with respect to many of its structural details and operating mechanisms. Hence, the scope of the invention, as defined by the claims, should not be limited to the specific details and arrangements herein disclosed but should be interpreted as broadly as is consistent with the state of the prior art.

This application is a divisional of application Serial No. 232,366, now Patent No. 2,790,287, granted April 30, 1957.

We claim:
1. A method of packaging cheese, which is in a heated, flowable condition, in a flexible wrapper comprising the steps of folding a flat, flexible wrapper into an open fluid receptacle having a bottom wall, upwardly extending side walls, and flaps respectively extending from each of the side walls, supporting the flexible fluid receptacle against collapse incident to the weight of the flowable cheese by placing the flexible fluid receptacle in a rigid mold having internal dimensions such that the flexible fluid receptacle fits snugly into the mold with the flaps extending upwardly beyond the upper edges of the mold, filling the flexible fluid receptacle with heated flowable cheese substantially to the level of the upper edges of the mold while continuing to support the flexible fluid receptacle in the mold, leveling the flowable cheese by placing on the surface thereof a flat, relatively stiff insert having dimensions resulting in engagement along substantially the entire length of each of the sides of the flexible fluid receptacle and by applying pressure to the insert while continuing to support the flexible fluid receptacle within the mold, folding the flaps along and over the respectively adjacent edges of the insert into mutually overlapping positions overlying the insert, and heat sealing the mutually overlapped flaps to each other to complete the package while the overlapping flaps are supported in planar condition on the surface of the flowable cheese by the insert and while continuing to support the flexible receptacle within the mold.

2. A method of packaging cheese which is in heated flowable condition in a flexible wrapper comprising the steps of folding a flat, generally rectangular, flexible wrapper into an open fluid receptacle by placing the wrapper under a plunger and by passing the plunger through a die to form the receptacle with a rectangular bottom wall, upwardly extending side walls, and flaps respectively extending from each of the side walls, supporting the flexible fluid receptacle against collapse resulting from the weight of the flowable cheese by placing the flexible fluid receptacle, incident to said passing of the plunger through the die, in a rigid mold having internal dimensions such that the flexible fluid receptacle fits snugly into the mold with the flaps extending upwardly beyond the upper edges of the mold, filling the flexible fluid receptacle with heated flowable cheese substantially to the level of the upper edges of the mold while continuing to support the flexible fluid receptacle in the mold, leveling the flowable cheese by placing on the surface thereof a flat, relatively stiff insert having dimensions resulting in engagement along substantially the entire length of each of the sides of the flexible fluid receptacle and by applying pressure to the insert while continuing to support the flexible fluid receptacle within the mold, folding the flaps along and over the respectively adjacent edges of the insert into mutually overlapping positions overlying the insert, and sealing the mutually overlapped flaps to each other to complete the package by applying heat and pressure against the overlapping flaps which are supported by the insert in planar condition on the surface of the flowable cheese, while at the same time, continuing to support the flexible fluid receptacle within the mold.

References Cited in the file of this patent
UNITED STATES PATENTS

| | | |
|---|---|---|
| 1,162,611 | Jones | Nov. 30, 1915 |
| 1,222,656 | Moyer | Apr. 17, 1917 |
| 1,313,974 | Anderson | Aug. 26, 1919 |
| 1,341,408 | Armstrong | May 25, 1920 |
| 1,425,481 | Howard | Aug. 8, 1922 |
| 2,229,864 | Moore | Jan. 28, 1941 |
| 2,276,387 | Gurwick | Mar. 17, 1942 |
| 2,307,076 | Ray | Jan. 5, 1943 |